(12) United States Patent
Zhao et al.

(10) Patent No.: US 7,975,485 B2
(45) Date of Patent: Jul. 12, 2011

(54) HIGH EFFICIENCY INTEGRATED HEAT ENGINE (HEIHE)

(75) Inventors: Yuanping Zhao, San Jose, CA (US); Yuanfan Zhao, Kunming (CN); Yuanjun Zhao, Kunming (CN); Yiheng Zhao, New York, NY (US)

(73) Assignees: Yuanping Zhao, San Jose, CA (US); Biyun Zhou, San Jose, CA (US)

( * ) Notice: Subject to any disclaimer, the term of this patent is extended or adjusted under 35 U.S.C. 154(b) by 341 days.

(21) Appl. No.: 12/200,251

(22) Filed: Aug. 28, 2008

(65) Prior Publication Data

US 2009/0056331 A1    Mar. 5, 2009

Related U.S. Application Data

(60) Provisional application No. 60/968,714, filed on Aug. 29, 2007.

(51) Int. Cl.
*F01B 29/04* (2006.01)
*F01K 23/10* (2006.01)
*F02G 3/00* (2006.01)
*F02B 47/02* (2006.01)
*F02M 25/00* (2006.01)

(52) U.S. Cl. ............. 60/712; 60/618; 60/620; 123/25 C; 123/25 R

(58) Field of Classification Search .............. 60/281, 60/524, 525, 620, 622, 645, 670, 712; 123/21, 123/25 R, 25 C, 25 P, 68

See application file for complete search history.

(56) References Cited

U.S. PATENT DOCUMENTS

| 892,790 | A | * | 7/1908 | Williams | 60/622 |
|---|---|---|---|---|---|
| 1,433,185 | A | * | 10/1922 | Da Costa | 60/622 |
| 2,671,311 | A | | 3/1954 | Rohrbach | |
| 2,791,881 | A | * | 5/1957 | Denker | 60/619 |
| 3,918,263 | A | * | 11/1975 | Swingle | 60/614 |
| 4,143,518 | A | * | 3/1979 | Kellogg-Smith | 60/712 |
| 4,301,655 | A | * | 11/1981 | Thomas | 60/712 |

(Continued)

OTHER PUBLICATIONS

Ron Graves, Stretch Efficiency in Combustion Engines with Implications of New Combustion Regimes, Chapter II.1, FY 2006 Progress Report on Advanced Combustion Engine Technologies, Department of Energy, 2007. Posted at: http://www1.eere.energy.gov/vehiclesandfuels/pdfs/adv_engine_2006/2006_advanced_engine_2-1.pdf.

*Primary Examiner* — Thomas E Denion
*Assistant Examiner* — Christopher Jetton

(57) ABSTRACT

The present invention is a High Efficient Integrated Heat Engine, or HEIHE for short. HEIHE is a reciprocal combustion engine integrated with both compound cycle and combined cycle. HEIHE comprises twin compound cylinder structure, with the first cylinder being the primary combustion and/or expansion cylinder; the second cylinder being the secondary combustion and/or expansion cylinder. Power strokes driven by expansions of different working fluids such as air-fuel combustion products, steam and compressed air, are integrated into one engine block. Twin cylinder structure provides compound expansions of three (3) different fluids as to recover the energies that would be lost with the exhaust fluids or during braking. All of these make HEIHE work around six (6) periods with twelve (12) operation strokes. Among six (6) working periods involved, four (4) periods contain four (4) different power strokes but only one of the power strokes consumes the fuel. Thus the fuel conversion efficiency could be greatly increased, or even be doubled comparing with the conventional internal combustion engine (ICE).

20 Claims, 25 Drawing Sheets

U.S. PATENT DOCUMENTS

| | | | | |
|---|---|---|---|---|
| 4,402,182 A | * | 9/1983 | Miller | 60/712 |
| 4,417,447 A | * | 11/1983 | Thomas | 60/712 |
| 4,433,548 A | * | 2/1984 | Hallstrom, Jr. | 60/712 |
| 4,706,462 A | * | 11/1987 | Soltermack | 60/712 |
| 5,191,766 A | * | 3/1993 | Vines | 60/619 |
| 5,261,238 A | * | 11/1993 | Olsen | 60/620 |
| 6,543,225 B2 | | 4/2003 | Scuderi | |
| 6,986,252 B2 | * | 1/2006 | Hedman | 60/712 |
| 2002/0194850 A1 | * | 12/2002 | Zaleski | 60/698 |
| 2006/0124079 A1 | | 6/2006 | Singh | |
| 2007/0022977 A1 | | 2/2007 | Brower | |

\* cited by examiner

CRACKSHAFT ANGLE = 0 DEGREE

CRACKSHAFT ANGLE = 90 DEGREE

CRACKSHAFT ANGLE = 270 DEGREE

CRACKSHAFT ANGLE = 360 DEGREE

CRACKSHAFT ANGLE = 450 DEGREE

CRACKSHAFT ANGLE = 630 DEGREE

CRACKSHAFT ANGLE = 720 DEGREE

CRACKSHAFT ANGLE = 810 DEGREE

CRACKSHAFT ANGLE = 990 DEGREE

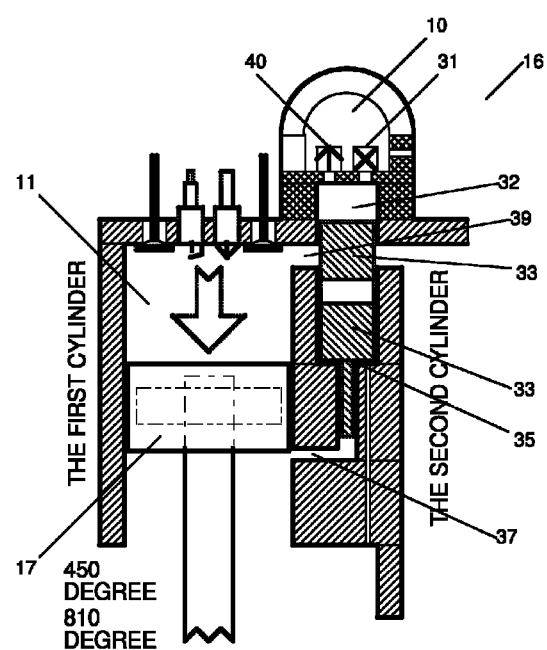
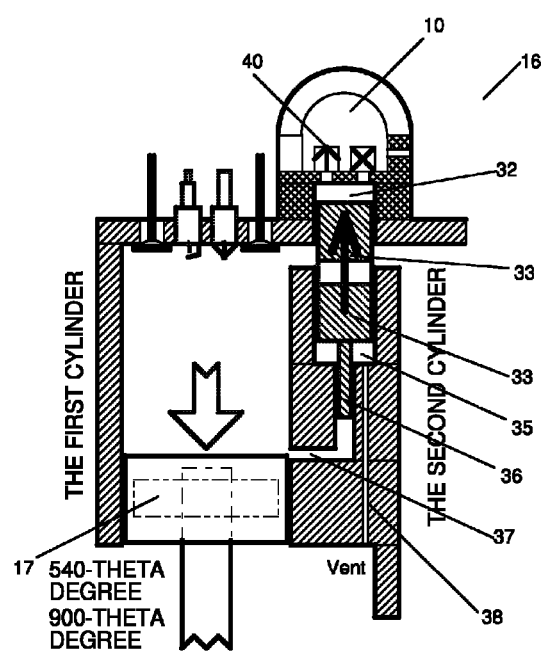
FIG. 12  FIG. 13

CRACKSHAFT ANGLE = AC270 DEGREE

CRACKSHAFT ANGLE = AC450 DEGREE

CRACKSHAFT ANGLE = CAE90 DEGREE

CRACKSHAFT ANGLE = CAE270 DEGREE (a) IN-CYLINDER CATALYTIC MESHES
(b) CYLINDER WATER JACKET
(c) ENGINE BLOCK THERMAL INSULATION
(d) PISTON CROWN/CAVITY THERMAL INSULATION

High Efficiency Integrated Heat Engine (HEIHE) Fuel Conversion Efficiency Summary   8/20/2007

| No. | ITEM NAME | FEATURE & BENEFIT | Lower Gain % | Minimum Efficiency % | Higher Gain % | Maximum Efficiency % | Average Efficiency % |
|---|---|---|---|---|---|---|---|
| 1 | Primary Fuel Combustion Expansion | Baseline Power Stroke of Conventional ICE | 100 | 25.00 | 100 | 30.00 | 27.50 |
| 2 | Secondary Fuel Combustion Expansion | Over-Expanded Compound Power Stroke | 20 | 5.00 | 22 | 6.60 | 5.80 |
| 3 | Primary Steam/Fluid Expansion | The Second Fluid (Steam) Power Stroke | 35 | 8.75 | 40 | 12.00 | 10.38 |
| 4 | Secondary Steam/Fluid Expansion | Over-Expanded Steam Power Stroke | 20*[3] | 1.75 | 22*[3] | 2.64 | 2.20 |
| 5 | Removed Cooling System | Cylinder Internal Steam/Fluid Cooling | | 2.00 | | 3.00 | 2.50 |
| 6 | Exhaust Actuated Valves (EAV) | Camless, Spring less, Harvest Energy | | 2.00 | | 3.00 | 2.50 |
| 7 | Injective Supercharger | Increased Power Density, Low RPM Torque | | 2.00 | | 3.00 | 2.50 |
| 8 | Evaporative Intercooler | Lower Charge Temperature, Finest Mixture | | 2.00 | | 3.00 | 2.50 |
| 9 | Air Hybrid Braking Power Regeneration | Integrated Air / Heat Storage, No Starter | 22 | 5.50 | 33 | 9.90 | 7.70 |
| 10 | In-Cylinder Catalytic Meshes | Harness Catalytic Convention Energy | | 1.00 | | 2.00 | 1.50 |
| 11 | Staged Combustion | Higher Efficiency, Lower Emissions | | 1.00 | | 2.00 | 1.50 |
| 12 | Super Heated Water Jacket | Recycle Heat Loss from Cylinder Wall | | 1.00 | | 2.00 | 1.50 |
| 13 | Engine Body Thermal Insulation | Reduced Heat Loss | | 1.00 | | 2.00 | 1.50 |
| 14 | SUBTOTAL Efficiency | Summation of above 13 Positive Gains | | 58.00 | | 81.14 | 69.57 |
| 15 | Supercharger Power Consumption | 15--20% of THE SUBTOTAL (Line14) | -20*[14] | -11.60 | -15*[14] | -12.17 | -11.89 |
| 16 | TOTAL Efficiency from HEIHE | High Efficiency Integrated Heat Engine | | 46.40 | | 68.97 | 57.68 |
| 17 | TOTAL Efficiency Gain Ratio | High Efficiency Integrated Heat Engine | Times | 1.86 | | 2.30 | 2.08 |
| 18 | TOTAL Efficiency Percentage Gain | High Efficiency Integrated Heat Engine | % | 85.60 | | 129.90 | 107.75 |

FIG. 27

HIGH EFFICIENCY INTEGRATED HEAT ENGINE (HEIHE)

FIELD OF THE INVENTION

The present invention relates to high efficiency heat engine with compound cycle and combined cycle, particularly to internal combustion engine integrated with multiple power strokes from multiple cylinders and multiple working fluids such as air-fuel combustion products, steam and compressed air.

BACKGROUND OF THE INVENTION

Internal combustion engine (ICE) was invented in 1876. Its typical four-stroke reciprocal piston configuration is still the primary engine format today. Modern gasoline ICE has 25% to 30% fuel conversion efficiency. This means that only 25% to 30% of the energy in the consumed fuel is converted into mechanical power, while the rest is lost through friction and heat. Due to millions of ICE currently in use worldwide, the improvement in ICE fuel conversion efficiency will have huge impacts on energy consumption, fuel economy, fuel reserve, dependency on foreign oil, and the environment.

ICE causes air pollution by discharging emission gases. The emissions from millions of vehicles combine with sunshine and moisture to produce greenhouse effect. Although governments continue to pass through anti-pollution laws, automobile manufacturers are designing new vehicles with improved emissions, and oil companies are changing their formulations to burn more clearly, dangerous emissions from vehicles still remain an environment problem.

One of the major content of ICE exhaust is carbon dioxide, which contributes to global warming. The increasing density of carbon dioxide traps the solar heat, causing the atmosphere temperatures to rise, leading to violent weather patterns and the melting of polar icecaps.

The best way to reduce carbon dioxide emissions is to burn less fossil fuel by using engines with higher efficiency. Even when we enter the era of biofuels and/or alternative fuels, or hydrogen fuels finally, increasing fuel conversion efficiency and reducing fuel consumption is still a significant strategic solution, because the higher the fuel costs, the higher the engine efficiency is expected.

It is believed that much of benefit would come from fuel efficiency improvement. A 10% efficiency improvement in vehicle performance would save over $10 billion of US dollars and reduce emissions of carbon dioxide by 140 million tons per year. A 20% efficiency improvement could reduce foreign oil used today by one-third. Environmentalists claim that increasing the average vehicle mileage to 40 MPG would save more oil than we get from Persian Gulf imports, the Arctic Wildlife Refuge and California offshore drilling combined. Consumers would save billions of dollars in fuel costs. Reduction in emissions would be in the hundreds of millions of tons per year, and dependency on foreign oil would be drastically reduced.

Therefore, a new kind of heat engine, with much higher fuel conversion efficiency, is desired that addresses the immediate and specific needs of reducing fossil fuel consumption, reducing greenhouse gas discharge and reducing combustion exhaust emissions.

Despite immense efforts over the past 100 years, engine fuel conversion efficiency has no major improvement both theoretically and practically. Around academic field of ICE, Homogeneous Charge Compression Ignition (HCCI) is a well-known theory that it was referred as a hopeful ICE solution, and was being studied extensively. But little progress was achieved during the past decades, nor has its practical utilization been found. Until recently, top US academic authority turns to promote Heterogeneous Combustion and Staged Combustion adversely. This could be a fact that fully turns HCCI down. Wondering back and forth theoretically, more fails than success, ICE has suffered the lack of significant progress in practice over the past centenary.

However, it is not impossible to improve fuel conversion efficiency of heat engine. During 19th century, a steam engine with an efficiency of 6% to 7% was referred as high efficient. Not until the middle of 20th century, when steam engine was almost being replaced by ICE, a French mechanical engineer called Andre Chapelon was able to obtain 13% efficiency by thermodynamically modifying steam engine with compound cylinders and super-reheating. This could be a historical fact that the engine efficiency can be doubled. Modern late 20th century power plants utilizing combined heat-work conversion cycles could yield an overall thermal efficiency as high as 60%, where different working fluids drive different power cycles, obtaining a combined thermal efficiency from each of the individual power cycles. This could be another evident that engine efficiency could be doubled from the current 30% from conventional ICE. All of these could be the clues that lead to engine fuel conversion efficiency improvement. Based on such an inventive thinking, we could foresee that the challenge and chance of the 21st century engine revolution is waving to us.

PRIOR ART

Early in 1954, Switzerland inventor Hans Rohrbach disclosed a design idea that injects liquid water into the combustion chamber of diesel engine in his U.S. Pat. No. 2,671,311. This idea makes conventional four-stroke engine into six-stroke by injecting liquid water into the combustion chamber after fuel exhaust stroke, causing additional steam expansion stroke and steam exhaust stroke. Obviously, this kind of extra steam expansion stroke would increase engine fuel conversion efficiency. This invention even has external steam condensing and recirculation facility that recycles expanded steam exhaust. Its brilliant design idea of multiple working fluid combined heat-work conversion cycles could be a useful treasure in ICE industry. Unfortunately, this great invention has not yet been put into practice as of today.

Not until 2006, US inventor Bruce Brower physically implemented the first working sample of six-stroke engine with combustion chamber water injection, and published his idea with US Patent Publication No. 20070022977. Based on his experiment, it is believed that six-stroke engine with combustion chamber water injection could obtain a gain of 40% in efficiency over conventional ICE.

US Patent Publication No. 20060124079 is also based on six-stroke engine with water injection, yet it is even integrated with a hot gas turbine for waste heat recovery. However, the separated power shafts between the engine and the gas turbine would make the integration lack of perfection. As a result, the gas turbine output could hardly be merged with engine output.

U.S. Pat. No. 6,543,225 (equivalent Chinese Patent No. ZL02814537.2) filed by US inventor Carmelo Scuderi disclosed a four-stroke engine with split cycles. This invention divides conventional four ICE strokes into a twin cylinder structure, in order to improve the effective angle of air-fuel combustion and expansion, as to match it with mechanical torque angle of the engine. Although twin cylinder structure has been utilized, it bears no compound secondary combustion and expansion theorem. Mechanically and structurally, this invention looks like a two-stroke engine combined with a supercharge pump.

BRIEF SUMMARY OF THE INVENTION

The present invention is a High Efficient Integrated Heat Engine, or HEIHE for short. HEIHE is a reciprocal combustion engine integrated with both compound cycle and combined cycle. HEIHE comprises twin compound cylinder structure, with the first cylinder being the primary combustion and/or expansion cylinder; the second cylinder being the secondary combustion and/or expansion cylinder. Power strokes driven by expansions of different working fluids such as air-fuel mixture, steam and compressed air, are integrated into one engine block. Twin cylinder structure provides compound expansions of three (3) different fluids as to recover the energies that would be lost with the exhaust fluids or during braking. All of these make HEIHE work around six (6) periods with twelve (12) operation strokes. Among six (6) working periods involved, four (4) periods contain four (4) different power strokes but only one of the power strokes consumes the fuel. Thus the fuel conversion efficiency could be greatly increased, or even be doubled comparing with the conventional internal combustion engine (ICE).

The following four (4) power strokes are involved in compound cycle and combined cycle of HEIHE:

1] Primary air-fuel power stroke—The primary air-fuel combustion and combustion products expansion in the first cylinder. This is the baseline power stroke being the same as the one happened in conventional ICE;

2] Secondary air-fuel power stroke—The secondary air-fuel combustion and expansion in the second cylinder;

3] Primary steam/fluid power stroke—The primary steam generation and/or working fluid expansion in the first cylinder; and 4] Secondary steam/fluid power stroke—The secondary steam and/or working fluid expansion in the second cylinder.

Fluid injection is a critical procedure for HEIHE operation. Normally, liquid water is a major fluid for injection in a multiple working fluid engine. However, water is such a fluid that requires very large evaporating heat to change the phase in physics that it absorbs the waste heat, reduces cylinder temperature but does not provide enough expansion for mechanical work. Therefore, this inventor is considering of utilizing compressed air as the second fluid for injection. Such kind of fluid is hardly corrosive, yet it does not have to change phase before making expansion; and its specific heat is close to that of combustion products, the first engine fluid to be combined inside the engine cylinders, resulting an even, smooth heat exchange between two fluids. The result could be better fluid expansion, thus generating more available mechanical work based on waste heat recovery.

Beside the above four (4) power strokes, other efficiency improving features are also integrated into HEIHE:

1] Removed cooling/radiator system. Due to the internal fluid cooling effect by fluid injection into combustion chamber and external thermal convention effect by inter-cylinder heat conveying fluid jacket, external cooling system that is a must to a conventional ICE could no longer be required. Thus the weights of radiator and water pump could be removed, and the mechanical power consumed by water pump would be eliminated.

2] Exhaust Actuated Valves (EAV). EAV is exhaust discharge valve driven by exhaust pneumatic pressure instead of by engine mechanical power, making use of the remaining energy from the exhaust gases.

3] Injective supercharger. In one of the working periods, the second cylinder can be utilized as a piston air compressor, pre-charging the incoming fresh air into the first cylinder through an intermediate air storage container. The pressured air from air storage container could drive an injective pump while rushing toward the first cylinder, sucking more cool fresh air into the first cylinder. The expansion of compressed air injecting through injective pump could also provide some cooling effect.

4] Evaporative intercooler. Evaporative intercooler could be installed between twin compound cylinders. The above mentioned intermediate air storage container could also function as an evaporative intercooler. Liquid fuel would be metered and injected into evaporative intercooler during the pre-charge stroke. Fuel evaporation happens inside the evaporative intercooler, absorbing the heat generated from air compression which in turn evaporates more fuel into air-fuel mixture. Heated evaporation plus injective pumping actions would result the finest air-fuel mixture.

5] Braking power regeneration by compressed air, or air hybrid. During the process of vehicle deceleration and/or braking, HEIHE would work in air compressor (AC) mode, converting vehicle's kinetic energy into the stored pneumatic energy and stored thermal energy respectively. During the process of vehicle acceleration and/or starting, HEIHE would work in compressed air engine (CAE) mode, converting the stored pneumatic energy and stored thermal energy into mechanical power that starts and drives the vehicle, eliminating engine starter and its cranking power storage.

6] In-cylinder catalytic meshes.

(6a) In the first cylinder, built-in catalytic mesh is utilized to enhance the process of steam cracking into hydrogen and oxygen under high temperature of combustion chamber, and also to enhance the process of steam cracking and/or hydrocracking of unburned hydrocarbons. All of these cracking processes would result combustible gases that carry heat energy.

(6b) In the second cylinder, built-in catalytic mesh is utilized to promote the secondary combustion of air-fuel combustion products, or to further promote exhaust oxidation with fresh air, as to reduce exhaust emissions while harnessing heat energy released from the secondary combustion of air-fuel combustion products. All of those cracking processes happened in the first cylinder could also be repeated here in the second cylinder, if the temperature allows.

7] Staged combustion. Staged combustion could be implemented by applying different air-fuel ratios to twin compound cylinders. It helps to increase fuel combustion efficiency, and to decrease engine emissions.

8] Water jacket around the first cylinder could work as a fluid superheater, pre-heating the fluid to be injected into the cylinder while cooling the cylinder.

9] Thermal insulated engine block and insulated piston crown and piston cavity, reducing thermal energy loss from engine body.

10] Thermal energy recovery, using heat exchangers to absorb thermal energy released by the air compression from braking power regeneration, and store the heated thermal energy carrying fluid into a vacuum insulated thermo tank for later use.

11] Exhaust heat energy recovery. In case compressed air is used as the fluid for injection, the compressed air could be pre-heated by exhaust heat through an exhaust heat exchanger, or exhaust pipe could be utilized as heat exchanger, so as to absorb waste heat and feed waste heat back to the engine.

12] Microcomputer controlled camless electromagnetic actuated cylinder valves. Such kind of cylinder valves would support unlimited variable valve timing, so that HEIHE disclosed in the present invention could be programmed to implement either a Miller Cycle or Atkinson cycle, or even both of them, or other efficiency improving cycles. They would also configure HEIHE into AC mode or CAE mode for braking power regeneration.

Therefore, it would be desirable that a High Efficient Integrated Heat Engine, or HEIHE bring much benefit, efficiency, cost-effectiveness and environment friendship to the future vehicles and power plants. There is no doubt that the present invention could revolutionize the ICE we used to.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous features and advantages of the present invention may be better understood by those skilled in the art by reference to the accompanying figures in which:

FIG. 12 is an operation diagram of exhaust actuated valve (EAV) of HEIHE in accordance with the present invention, with its crankshaft angle at 450 degree or 810 degree after starting point;

FIG. 13 is an operation diagram of exhaust actuated valve (EAV) of HEIHE in accordance with the present invention, with its crankshaft angle at 540 minus Theta degree or 900 minus Theta degree after starting point;

FIG. 27 is a table of fuel conversion efficiency summary of HEIHE in accordance with the present invention.

DETAILED DESCRIPTION OF THE INVENTION

Reference will now be made in detail to the presently preferred embodiments of the invention, examples of which are illustrated in the accompanying drawings.

The present invention is directed to High Efficiency Integrated Heat Engine, or HEIHE for short. HEIHE is a heat engine integrated with compound cycle and combined cycle. Twin compound cylinders are utilized as a basic structure of HEIHE, with the first cylinder being the primary combustion and/or expansion cylinder; the second cylinder being the secondary combustion and/or expansion cylinder. Power strokes driven by expansions of different working fluids such as air-fuel combustion products, steam and compressed air, are integrated into one engine block. Many other efficiency improving measures are also integrated in HEIHE, such as exhaust actuated valve (EAV), injective supercharger, evaporative intercooler and in-cylinder catalytic meshes. As a result, the operation of HEIHE comprises four (4) different power strokes, but consumes fuel at the baseline primary air-fuel power stroke only.

In the following description, numerous specific descriptions are set forth in order to provide a thorough understanding of the present invention. It should be appreciated by those skilled in the art that the present invention may be practiced without some or all of these specific details. In some instances, well known process operations have not been described in detail in order not to obscure the present invention.

Figure 1:
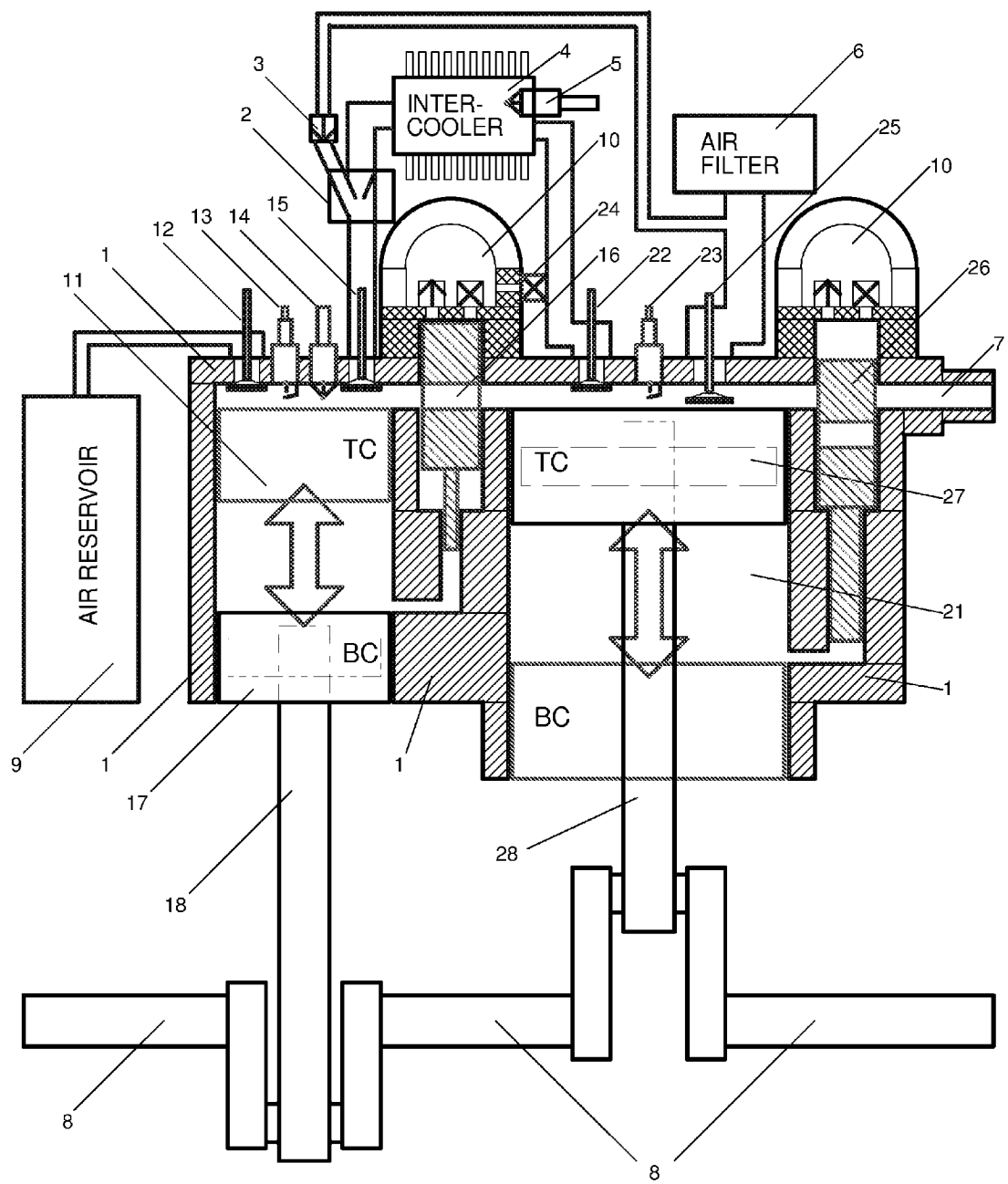
FIG. 1 is a basic structure diagram of HEIHE in accordance with the present invention.

Referring to FIG. 1, a basic structure diagram of HEIHE in accordance with the present invention is shown. HEIHE basically has a reciprocating engine structure, where the pistons move back and forth in cylinders and transmit power through connecting rods and crank mechanism to power output shaft. HEIHE may comprise a pair of compound twin cylinders within the same engine block 1, with the first cylinder 11 being the primary combustion and/or expansion cylinder; the second cylinder 21 being the secondary combustion and/or expansion cylinder. The first cylinder couples with a first piston 17 while the second cylinder couples with a second piston 27. Two pistons inside the twin cylinders are mechanically coupled with the crankshaft 8 with 180 degree of crankshaft angle (CA) difference. Thus when the second piston 27 is at the top-center (TC), the first piston 17 is exactly at the bottom-center (BC), or vise versa. The second cylinder has larger volume than that of the first cylinder, so as the compound extended expansion could happen when the working fluids are transferred from the first cylinder to the second cylinder. Larger cylinder volume results in either larger piston diameter (Bore) or larger displacement (Stroke), or both of them as shown in FIG. 1.

Still in FIG. 1, the first connecting rod 18 couples the first piston 17 with the crankshaft 8, while the second connecting rod 28 couples the second piston 27 with the crankshaft 8. On top of the first cylinder, there are storage valve 12, spark plug 13, fluid injector 14 and charge valve 15. A piston valve 16 controls working fluid transfer between twin cylinders, which is actuated vertically by exhaust gas pressure. Pressure chamber 10 keeps and provides actuate pressure to piston valve 16. Storage valve 12 controls the gas flow between the first cylinder 11 and air storage reservoir 9. Charge valve 15 controls the gas flow between injective supercharge pump 2 from evaporative intercooler 4 and the first cylinder 11.

On top of the second cylinder, there are pre-charge valve 22, spark plug 23 and intake valve 25. A piston valve 26 controls working fluid discharge from the second cylinder 21 to exhaust port 7, which is actuated vertically by exhaust gas pressure from the second cylinder 21. Pressure chamber 10 keeps and provides actuate pressure to piston valve 26. Pre-charge valve 22 controls the gas flow between the second cylinder 21 and evaporative intercooler 4. Intake valve 25 controls the gas flow between the second cylinder 21 and the air filter 6. A fuel injector 5 is mounted on the wall of evaporative intercooler 4, so as to inject fuel spray into the chamber of evaporative intercooler 4. A check valve 3 is installed at the fresh air input port of injective pump 2, as to limit the direction of input air flow. Switching valve 24 is utilized to regulate the pre-charging air flow that would be pumped into pressure chamber 10 for its proper working pressure.

Based on the compound working fluid expansion inside twin cylinders, 2 different working fluids would drive 2 different power strokes: air-fuel mixture combustion and combustion products expansion first, and then steam/fluid expansion. The steam/fluid is obtained by injecting fluid into the first cylinder at the end of air-fuel transfer stroke, so as to absorb the remaining heat inside the cylinders, and resulting steam/fluid cooling effect inside the cylinders.

Two different fluid expansions happen in two different cylinders would contribute four (4) different power strokes. These four (4) different power strokes are:

1] Primary air-fuel power stroke—The primary air-fuel mixture combustion and combustion products expansion in the first cylinder. This is the baseline power stroke being the same as the one happened in conventional ICE;

2] Secondary air-fuel power stroke—The secondary air-fuel combustion and combustion products expansion in the second cylinder;

3] Primary steam/fluid power stroke—The primary steam generation and/or working fluid expansion in the first cylinder; and 4] Secondary steam/fluid power stroke—The secondary steam and/or working fluid expansion in the second cylinder.

The above four (4) different power strokes could be judiciously scheduled into six (6) periods in order to obtain both the maximum mechanical efficiency and thermodynamic efficiency. During each period, two different strokes would happen in twin cylinders simultaneously, resulting totally twelve (12) strokes in a full HEIHE working cycle of 3 complete revolutions, or 1080 degree of crankshaft angle (CA). In one word, HEIHE disclosed in the present invention is a twelve-stroke heat engine.

Figure 2:
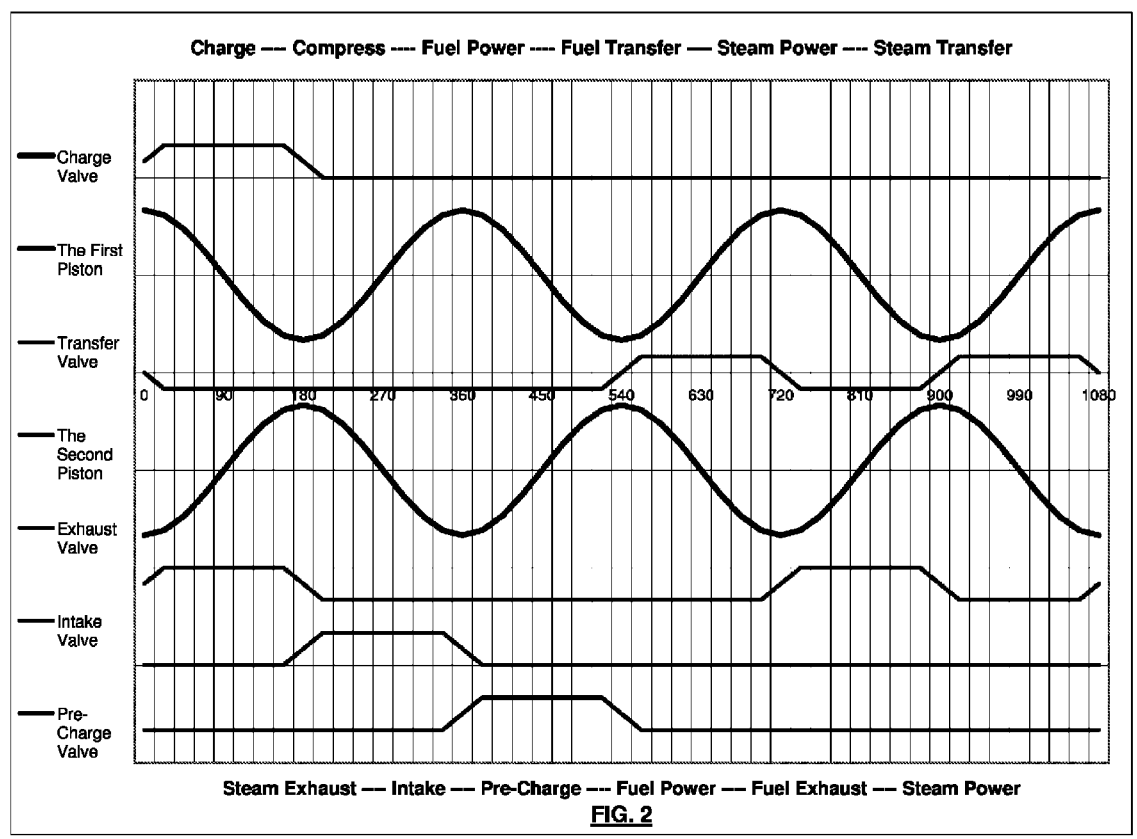
FIG. 2 is a sequence of events diagram of HEIHE in accordance with the present invention.

FIG. 2 is a sequence of events diagram of HEIHE in accordance with the present invention, where piston displacements and valve movements are shown along with the crankshaft angle turning around the total 12 strokes in a full HEIHE working cycle of 3 complete revolutions, or 1080 degree CA. Among 6 working periods, each period covers 180 degree CA. The related 12 strokes scheduled in 6 periods could be listed as follows:

1] The first period, from 0 degree to 180 degree CA, charge stroke in the first cylinder, with the first piston moves down from TC to BC; and steam/fluid exhaust stroke in the secondary cylinder, with the second piston moves up from BC to TC. Both charge valve 15 and exhaust valve 26 open during this period.

2] The second period, from 180 degree to 360 degree CA, compression stroke in the first cylinder, with the first piston moves up from BC to TC; intake stroke in the second cylinder, with the second piston moves down from TC to BC. Intake valve 25 opens during this period.

3] The third period, from 360 degree to 540 degree CA, primary air-fuel power stroke in the first cylinder, with the first piston moves down from TC to BC; and pre-charge stroke in the second cylinder, with the second piston moves up from BC to TC. A spark ignition happens in the first cylinder at 360 degree CA. Pre-charge valve 22 opens during this period.

4] The fourth period, from 540 degree to 720 degree CA, air-fuel transfer stroke in the first cylinder, with the first piston moves up from BC to TC; secondary air-fuel power stroke in the second cylinder, with the second piston moves down from TC to BC. Inter-cylinder transfer valve 16 opens during this period.

5] The fifth period, from 720 degree to 900 degree CA, primary steam/fluid power stroke in the first cylinder, with the first piston moves down from TC to BC; and air-fuel exhaust stroke in the second cylinder, with the second piston moves up from BC to TC. A fluid injection happens in the first cylinder at 720 degree CA. Exhaust valve 26 opens during this period.

6] The sixth period, from 900 degree to 1080 degree CA, steam/fluid transfer stroke in the first cylinder, with the first piston moves up from BC to TC; secondary steam/fluid power stroke in the second cylinder, with the second piston moves down from TC to BC. Inter-cylinder transfer valve 16 opens during this period.

Figure 3:
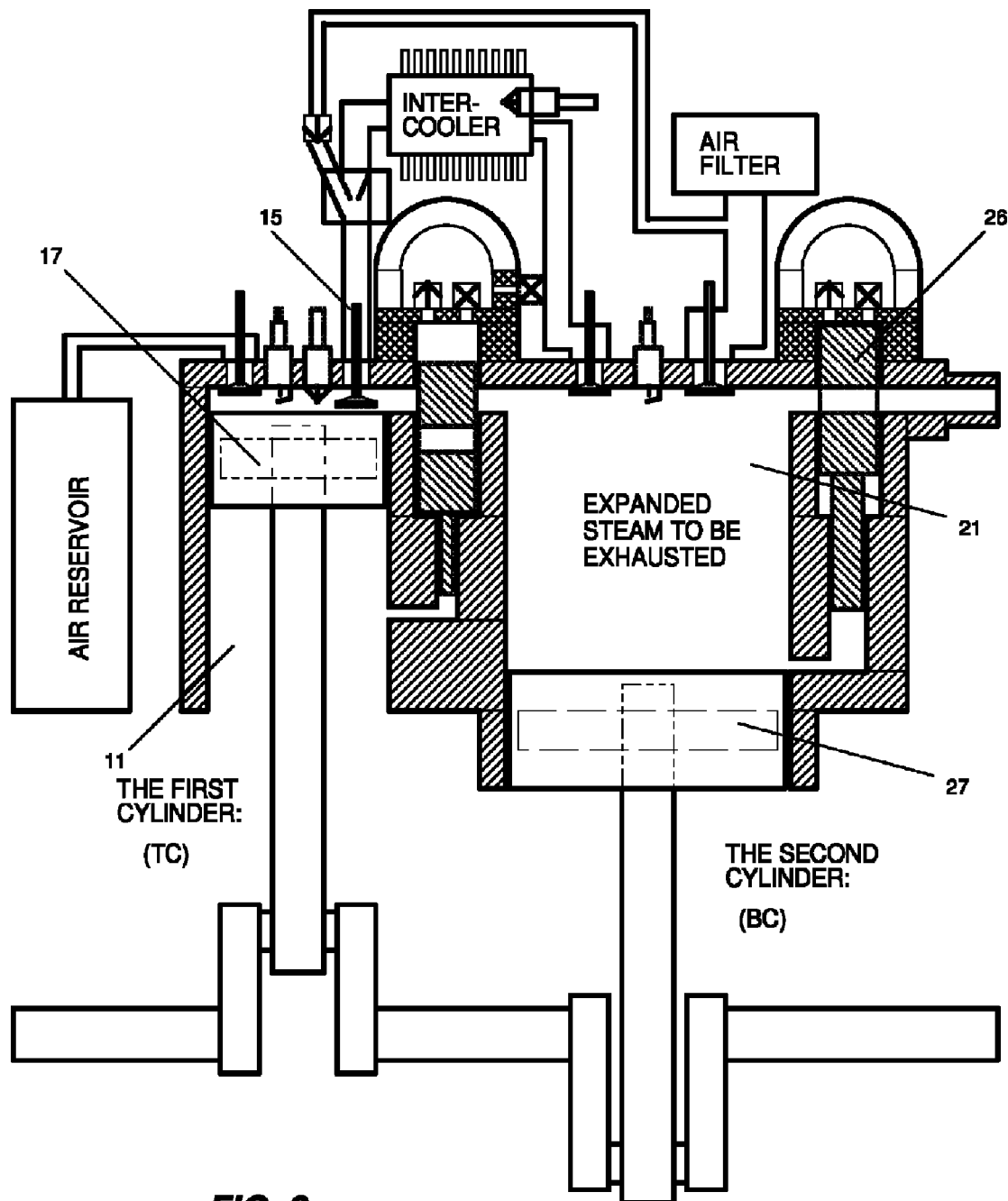
FIG. 3 is an operation diagram of HEIHE in accordance with the present invention, with its crankshaft angle at starting point of zero degree.

Now referring to FIG. 3, an operation diagram of HEIHE in accordance with the present invention is shown, with the crankshaft angle of HEIHE is at starting point and zero degree CA. The first piston 17 is at TC while the second piston 27 is at BC. Charge valve 15 is open, getting ready for air-fuel mixture to be charged into the first cylinder 11. Exhaust valve 26 is also open, getting ready for expanded steam/fluid happened in the previous working cycle to be exhausted from the second cylinder 21. Other valves would remain closed.

Figure 4:
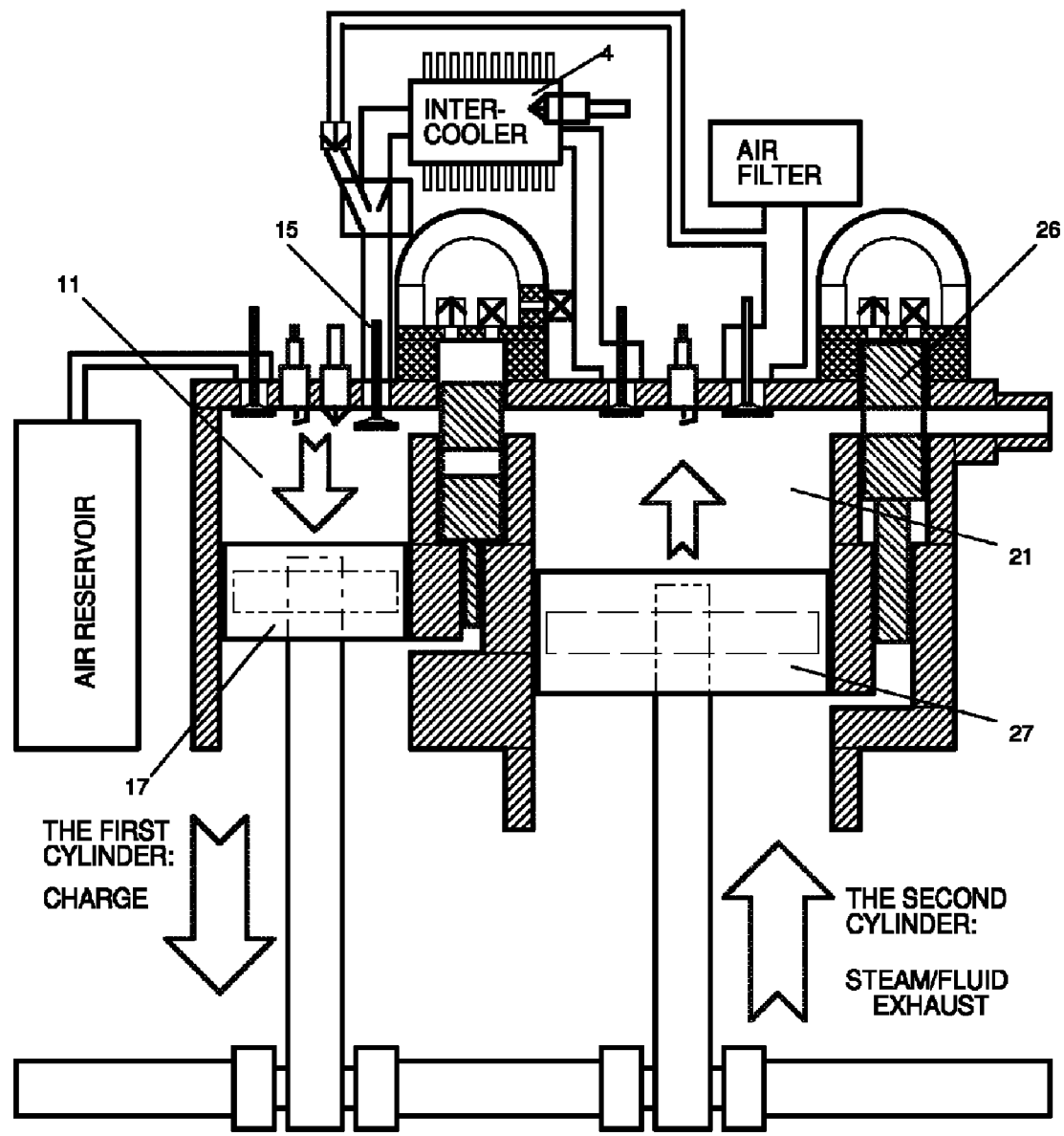
FIG. 4 is an operation diagram of HEIHE in accordance with the present invention, with its crankshaft angle at 90 degree after starting point.

Referring to FIG. 4, an operation diagram of HEIHE in accordance with the present invention is shown, with the crankshaft angle of HEIHE is at the first period and 90 degree CA. The first piston 17 is moving downward while the second piston 27 is moving upward. Charge valve 15 is open, so the pressured air-fuel mixture inside the evaporative intercooler 4 is charging into the first cylinder 11. Exhaust valve 26 is also open, so the expanded steam/fluid happened in the previous working cycle is discharging from the second cylinder 21. Other valves would remain closed. During this period, both charge stroke and steam/fluid exhaust stroke happen in the first cylinder and the second cylinder respectively.

Figure 5:
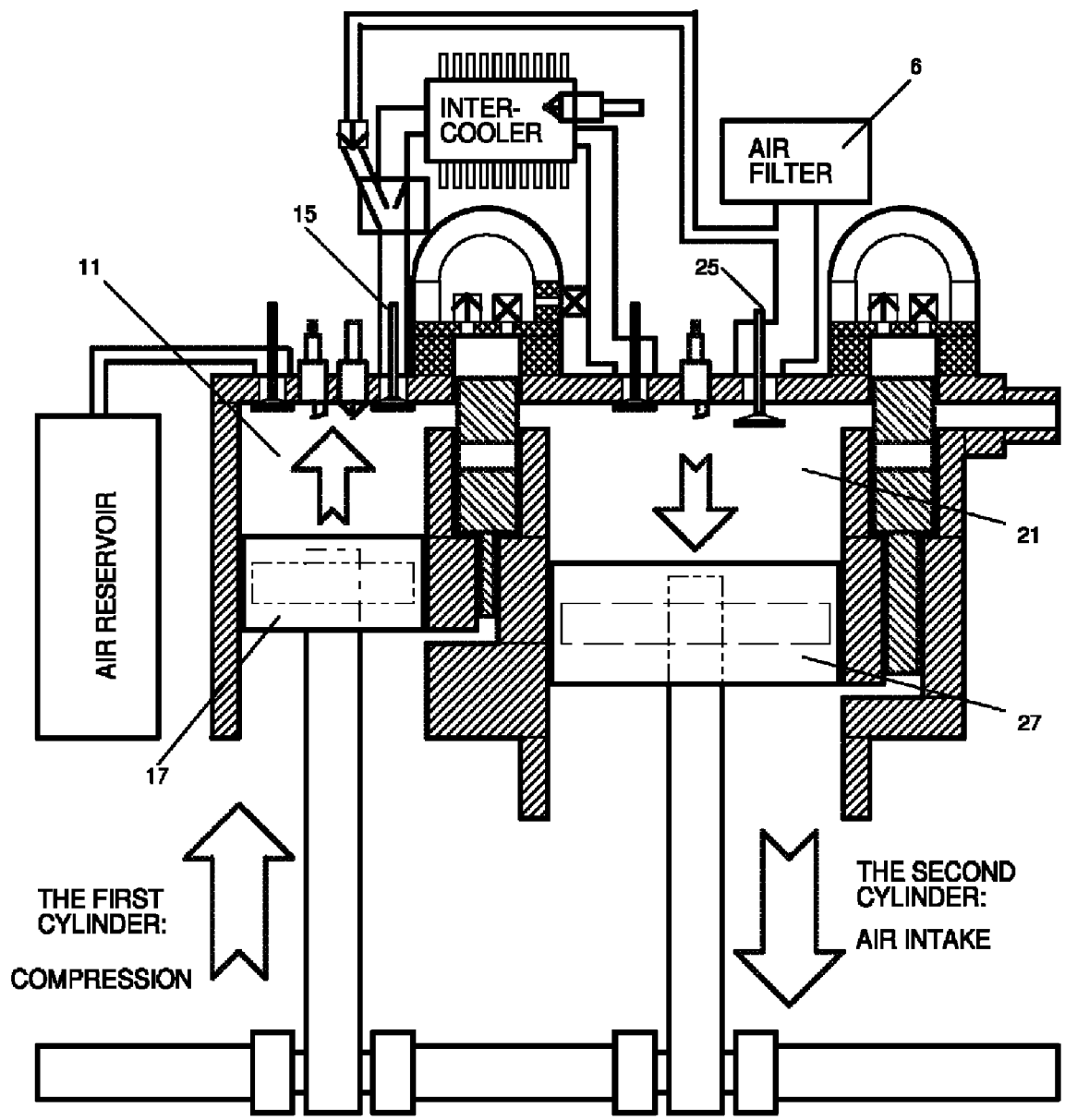
FIG. 5 is an operation diagram of HEIHE in accordance with the present invention, with its crankshaft angle at 270 degree after starting point.

Referring now to FIG. 5, an operation diagram of HEIHE in accordance with the present invention is shown, with the crankshaft angle of HEIHE is at the second period and 270 degree CA. The first piston 17 is moving upward while the second piston 27 is moving downward. Charge valve 15 is closed, so the air-fuel mixture is being compressed inside the first cylinder 11. Intake valve 25 is open, so that the fresh air is sucking into the second cylinder 21 through air filter 6. Other valves would remain closed. During this period, both compression stroke and intake stroke happen in the first cylinder and the second cylinder respectively.

Figure 6:
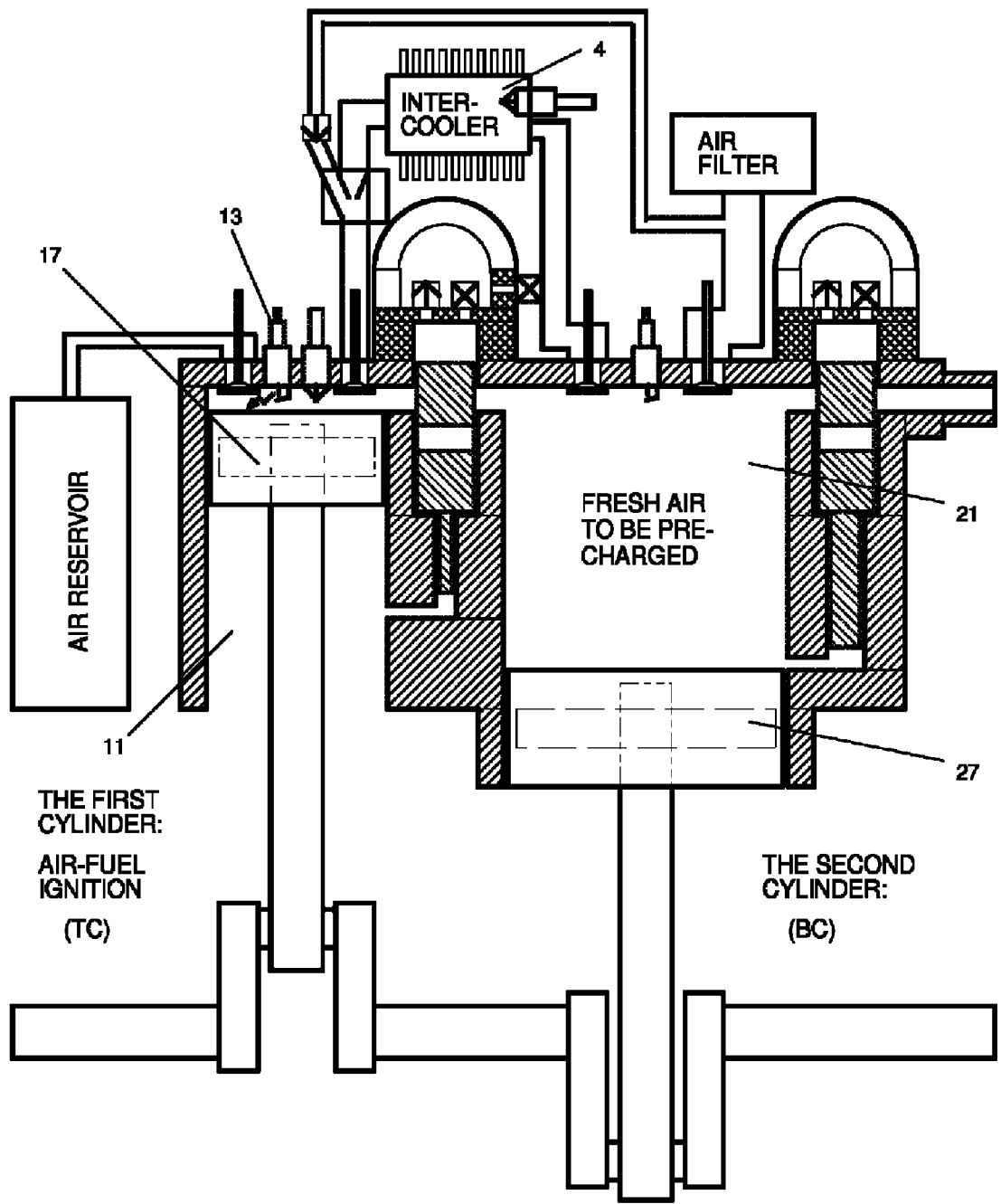
FIG. 6 is an operation diagram of HEIHE in accordance with the present invention, with its crankshaft angle at 360 degree after starting point.

Now referring to FIG. 6, an operation diagram of HEIHE in accordance with the present invention is shown, with the crankshaft angle of HEIHE is at spark ignition point and 360 degree CA. The first piston 17 is at TC while the second piston 27 is at BC. All the valves are closed. Spark plug 13 on top of the first cylinder is setting a firing spark onto the compressed air-fuel mixture, starting an air-fuel mixture combustion and expansion process inside the first cylinder 11. At this moment, the second cylinder 21 is already filled with fresh air, getting ready for pre-charging it into the evaporative intercooler 4.

Figure 7:
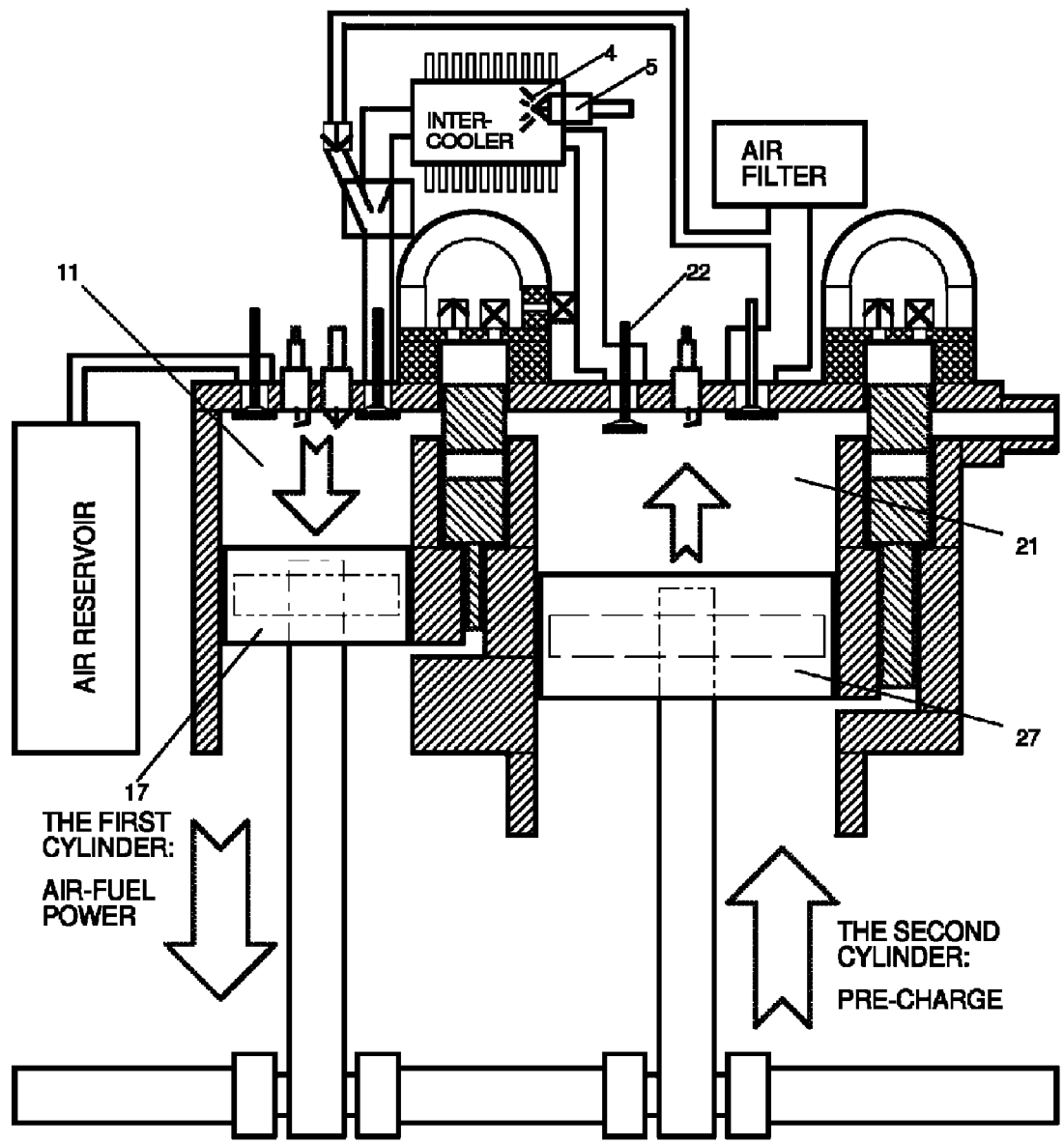
FIG. 7 is an operation diagram of HEIHE in accordance with the present invention, with its crankshaft angle at 450 degree after starting point.

Referring now to FIG. 7, an operation diagram of HEIHE in accordance with the present invention is shown, with the crankshaft angle of HEIHE is at the third period and 450 degree CA. The first piston 17 is moving downward while the second piston 27 is moving upward. All the valves remain closed for the first cylinder 11, so the air-fuel mixture is being combusted and expanded inside the first cylinder 11. Pre-charge valve 22 is also open, so that the fresh air could be pumped from the second cylinder 21 into the evaporative intercooler 4. Meanwhile during this period, fuel is injected into the evaporative intercooler 4 through fuel injector 5. Along with the incoming fresh air, the injected fuel absorbs the heat generated from air compression, evaporates inside the evaporative intercooler 4. Other valves would remain closed. During this period, both primary air-fuel power stroke and pre-charge stroke happen in the first cylinder and the second cylinder respectively.

Beside air intercooling function and fuel evaporation function, evaporative intercooler also serves as temporary intermediate compressed air storage, in which fuel would keep evaporating until it is discharged later. The resulted air-fuel mixture would be kept under pressure inside the evaporative intercooler until 4 periods later when the next charge stroke comes, as the period illustrated by FIG. 4 and described previously.

Figure 8:
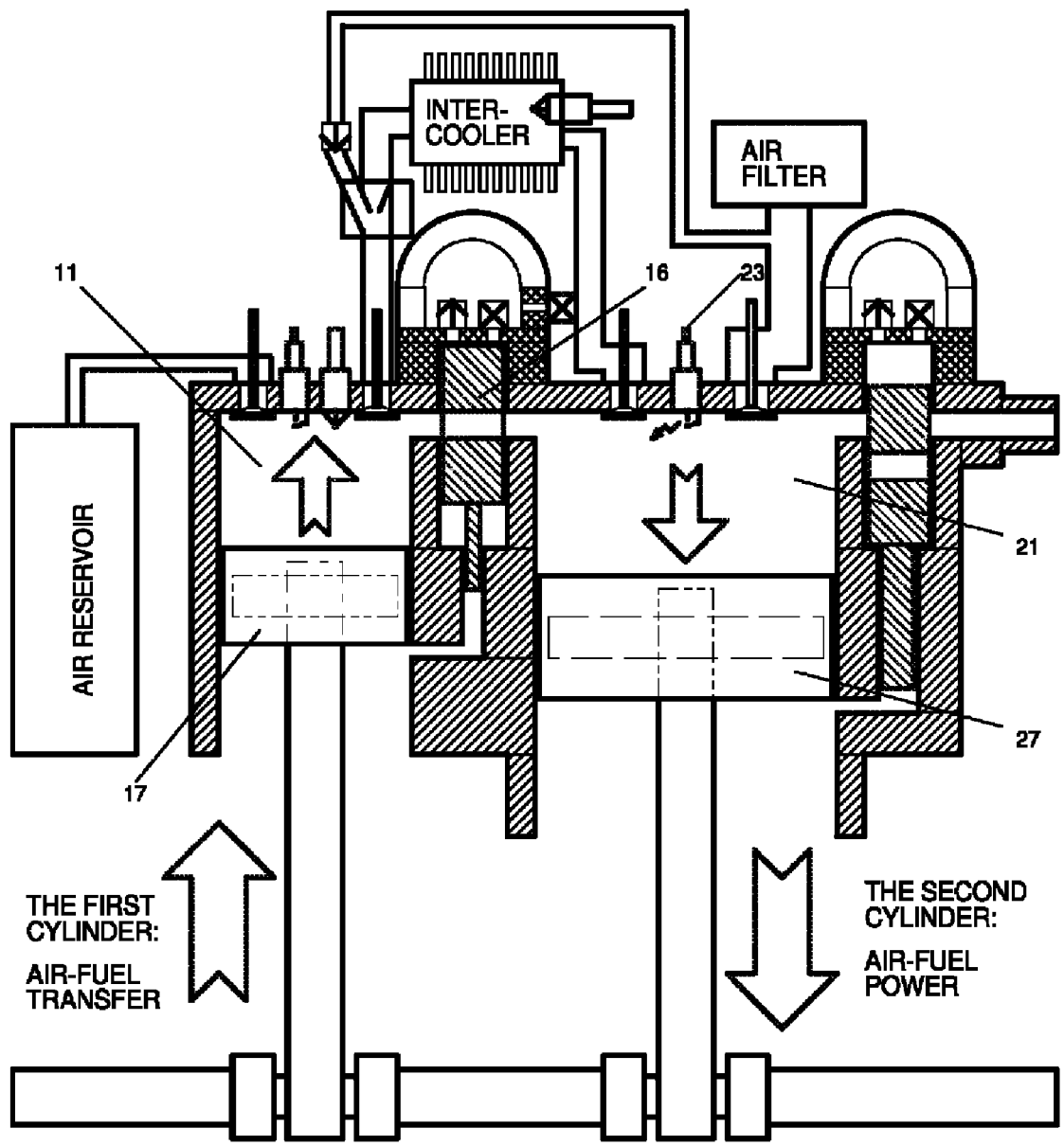
FIG. 8 is an operation diagram of HEIHE in accordance with the present invention, with its crankshaft angle at 630 degree after starting point.

Referring now to FIG. 8, an operation diagram of HEIHE in accordance with the present invention is shown, with the crankshaft angle of HEIHE is at the fourth period and 630 degree CA. The first piston 17 is moving upward while the second piston 27 is moving downward. Inter-cylinder transfer valve 16 is open, so the expanded air-fuel combustion products are being transferred from the first cylinder 11 into the second cylinder 21. Other valves would remain closed. Since the second cylinder 21 has larger volume than that of the first cylinder 11, the air-fuel combustion products transferred from the first cylinder 11 still has room to do further expansion. Thus the second cylinder 21 is contributing a positive work while the second piston 27 is moving downward. This is an important power stroke of HEIHE in accordance with the present invention called secondary air-fuel combustion and expansion stroke. During this period, both air-fuel combustion products transfer stroke and secondary air-fuel power stroke happen in the first cylinder and the second cylinder respectively. To enhance secondary air-fuel combustion, one or more firing sparks could also be applied into the second cylinder 21 through spark plug 23.

Figure 9:
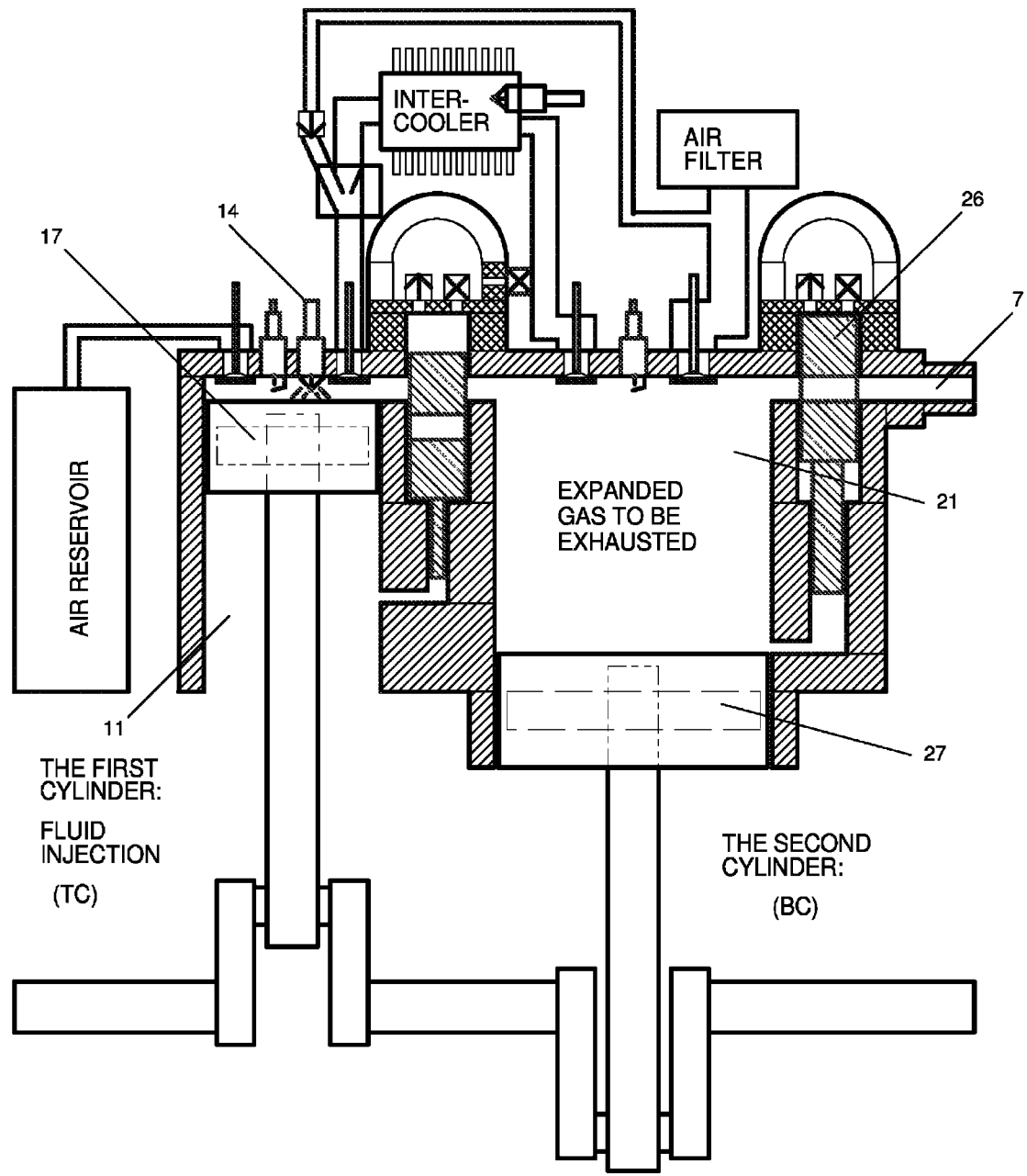
FIG. 9 is an operation diagram of HEIHE in accordance with the present invention, with its crankshaft angle at 720 degree after starting point.

Now referring to FIG. 9, an operation diagram of HEIHE in accordance with the present invention is shown, with the crankshaft angle of HEIHE is at fluid injection point and 720 degree CA. The first piston 17 is at TC while the second piston 27 is at BC. All the valves are closed except exhaust valve 26. Fluid injector 14 on top of the first cylinder is injecting fluid into combustion chamber of the first cylinder 11. At this moment, exhaust valve 26 is open, and the second cylinder 21 has already been filled with expanded secondary air-fuel combustion products, which is ready to be discharged out of the HEIHE through exhaust port 7. Water could be utilized as the fluid to be injected into the first cylinder 11. In this case purified water or distilled water would be preferred, which would leave no chemical residuals inside the cylinders. Other kind of fluid could also be used, such as compressed air, liquid air, liquid nitrogen or water solution of ethanol, where ethanol could serve as an anti-freezer. A mixture of purified water and compressed air could also be used as the fluid for injection.

In another embodiment, compressed air could be utilized as a dedicated fluid for injection. The unique benefits of such a gaseous fluid would be no need to change the phase before making expansion; the specific heat being very close to that of combustion products; no deposits and residuals to engine parts and non-corrosive to engine metal parts. Compressed air not only contains energy or being self-pressured, but also possesses a valuable thermodynamic feature that it trend to absorb, thus to pick up or recover, heat energy from low grade heat sources such as the exhaust heat as well as from surroundings.

Figure 10:
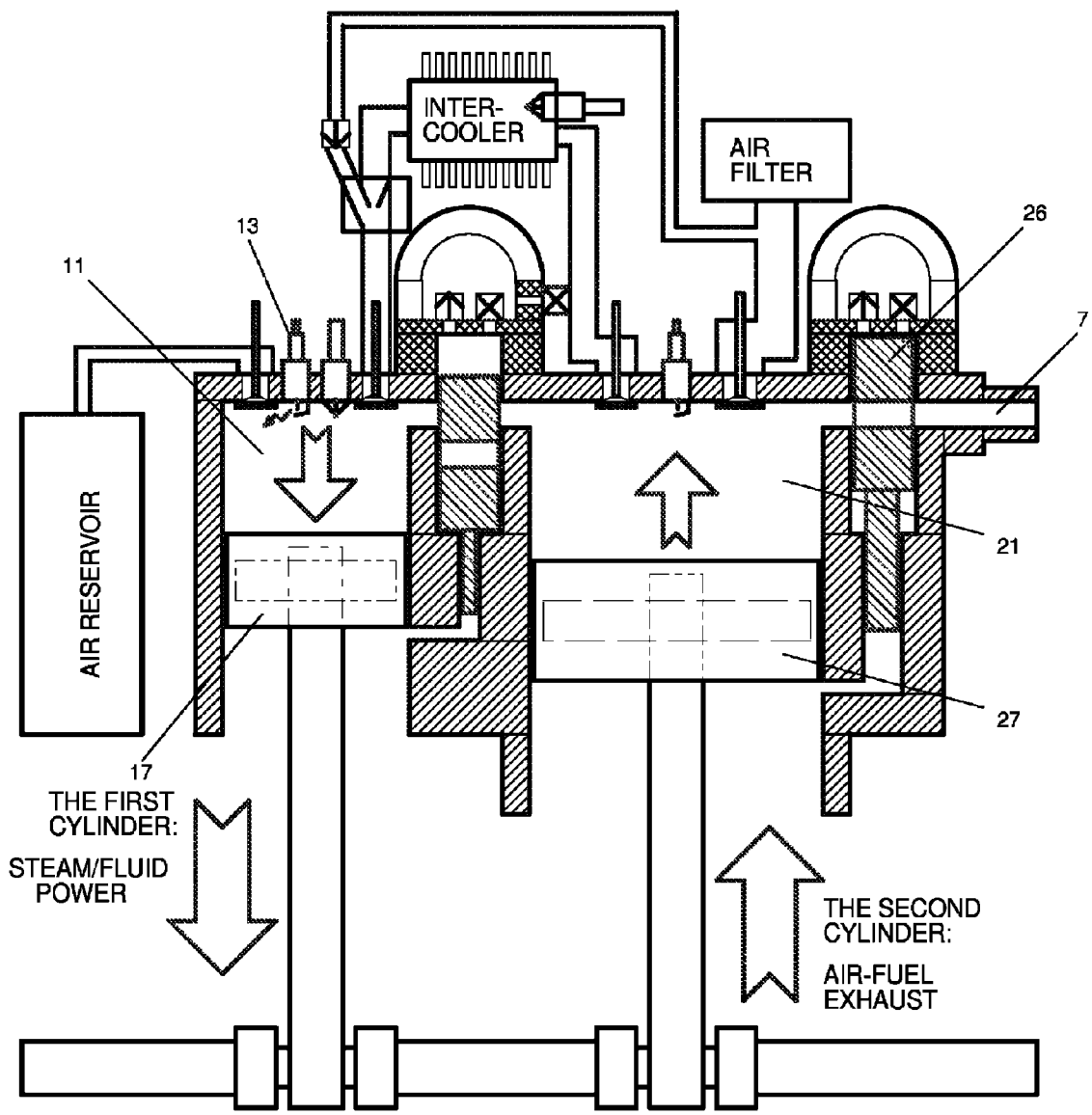
FIG. 10 is an operation diagram of HEIHE in accordance with the present invention, with its crankshaft angle at 810 degree after starting point.

Referring now to FIG. 10, an operation diagram of HEIHE in accordance with the present invention is shown, with the crankshaft angle of HEIHE is at the fifth period and 810 degree CA. The first piston 17 is moving downward while the second piston 27 is moving upward. All the valves remain closed for the first cylinder 11. Absorbing the remaining heat on the cylinder wall from the previous air-fuel combustion, the injected fluid is being rapidly heated and the steam is being generated and expanded inside the first cylinder 11.

Thus the first cylinder 11 is contributing a positive work while the first piston 17 is moving downward. This is another important power stroke of HEIHE in accordance with the present invention called primary steam/fluid expansion stroke. In the second cylinder 21 side, exhaust valve 26 is open, so that the expanded secondary air-fuel combustion products could be discharged from the second cylinder 21 to the outside of the HEIHE through exhaust port 7. Meanwhile during this period, spark plug 13 on top of the first cylinder is setting multiple firing sparks against the expanding steam/fluid that might contain combustible gases like hydrogen, oxygen, carbon monoxide, methane and unburned hydrocarbons, making the expansion more powerful inside the first cylinder 11. During this period, both primary steam/fluid power stroke and secondary air-fuel exhaust stroke happen in the first cylinder and the second cylinder respectively.

It must be emphasized that the combustible gases during the above period would come from physical process such as thermal cracking of steam, and chemical processes such as steam cracking and/or hydrocracking of unburned hydrocarbons. For example, under high combustion chamber temperature steam would be thermally cracked into hydrogen and oxygen. Unburned hydrocarbons would be steam cracked chemically into hydrogen, oxygen, carbon monoxide, methane and other smaller-molecule hydrocarbons. Further, unburned hydrocarbons would be hydrocracked chemically into lighter, more combustible hydrocarbons. All of these cracking products are combustible and contain latent thermal energy. Therefore, combustion must be made as to convert this latent thermal energy into heat energy. Once the heat energy is converted to the expansion inside the cylinder during the steam/fluid power stroke, it makes extra power.

Figure 11:
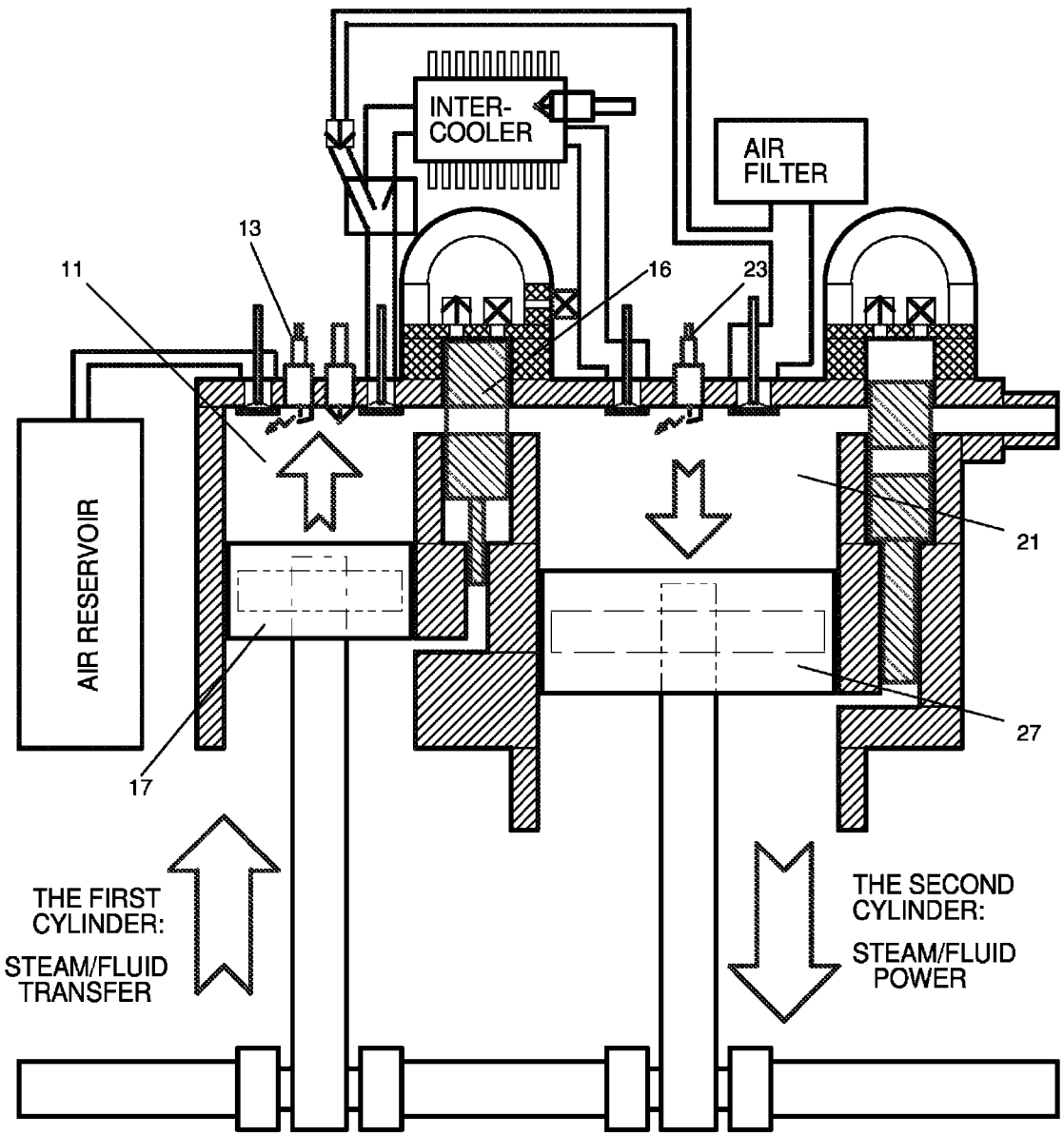
FIG. 11 is an operation diagram of HEIHE in accordance with the present invention, with its crankshaft angle at 990 degree after starting point.

Referring now to FIG. 11, an operation diagram of HEIHE in accordance with the present invention is shown, with the crankshaft angle of HEIHE is at the sixth period and 990 degree CA. The first piston 17 is moving upward while the second piston 27 is moving downward. Inter-cylinder transfer valve 16 is open, so the expanded steam, or any other fluid, is being transferred from the first cylinder 11 into the second cylinder 21. Other valves would remain closed. Since the second cylinder 21 has larger volume than that of the first cylinder 11, the steam, or any other fluid, transferred from the first cylinder 11 still has room to do further expansion. Thus the second cylinder 21 is contributing a positive work while the second piston 27 is moving downward. This is another important power stroke of HEIHE in accordance with the present invention called secondary steam/fluid expansion stroke. During this period, both steam/fluid transfer stroke and secondary steam/fluid power stroke happen in the first cylinder and the second cylinder respectively. For the same reason stated above, during this period spark plugs 13 and 23 on top of both cylinders are setting multiple firing sparks against the expanding steam/fluid that might contain combustible gases like hydrogen, oxygen, carbon monoxide, methane and unburned hydrocarbons, making the expansion more powerful inside the second cylinder.

In FIG. 1, switching valve 24 is an unique device that could not only be utilized to regulate the pre-charging air flow that would be pumped into pressure chamber 10 for its proper working pressure, but also to reduce the amount of pre-charging air flow that would be fed into the evaporative intercooler. Whenever switching valve 24 is open electromagnetically, it would branch a determined portion of pre-charging stream into pressure chamber 10. As a result, a proper working pressure could be maintained inside pressure chamber 10. In the other hand, reducing the amount of pre-charging stream would change the volumetric capacity of the charge flowing into the first cylinder. Thus totally resulted compound compression ratio of twin compound cylinders would be altered, obtaining the effect of controlled variable compression ratio.

Variable compression ratio could be one of the features of HEIHE disclosed in the present invention. It would makes changing compression ratio possible during the operation according to the varying load. To achieve higher power outputs without increasing speed, more fuel must be burnt and therefore more air would be required. As supercharger would have been integrated into HEIHE to increase the charging pressure, it might result in undesired detonation of the air-fuel mixture unless the compression ratio could be decreased. This could be done to greater or lesser extent with massive increases in power whenever possible, resulting a smaller sized efficient engine that behaves exactly like a larger sized engine but turns into a highly tuned one on demand. Variable compression ratio is becoming increasingly desirable as it would increase fuel conversion efficiency and provide better fuel economy.

Further, variable compression ratio would make HEIHE multiple fuels compatible. Many alternative fuels, such as methanol, ethanol, propane, LPG, nature gas and hydrogen, have higher octane rating than that of gasoline. So higher compression ratio would be expected for higher fuel conversion efficiency if fuel octane rating allows. In case gasoline would be used as HEIHE fuel but we may intended to burn gasoline fuel under the Compression Ignition by Direct Injection (CIDI) mode in order to obtain higher fuel conversion efficiency, variable compression ratio would be absolutely required. In this case, spark plug 13 on top of the first cylinder 11 could be replaced by a fuel injector, so as to inject gasoline fuel into the first cylinder directly. Apparently, CIDI mode would also make HEIHE compatible to diesel or biodiesel fuels.

In FIG. 1, piston valves 16 and 26 could also be named as Exhaust Actuated Valve (EAV). As the name implies, they are actuated by exhaust pressure. FIGS. 12 through 17 show operation processes of EAV by taking EAV 16 as an example. EAV 26 works in much the same way as EAV 16. The only difference is the diameter of EAV 26, which needs larger diameter for its driving head due to the lower exhaust pressure from the second cylinder 21.

Referring now to FIG. 12, an operation diagram of EAV inside HEIHE in accordance with the present invention is shown, with the crankshaft angle of HEIHE is at the power strokes of either 450 or 810 degree CA. The first piston 17 is moving downward. EAV 16 remains closed during the power stroke. The EAV pressure chamber 10 keeps a positive pressure Peav. Electro-magnetic switching valve 31 once opened before the power stroke as to charge the upper EAV cylinder 32 with the positive pressure Peav. On bottom side of EAV piston 33, there's an exhaust duct 37 from bottom area of the cylinder 11. During the most of the downward travel of power strokes, the exhaust duct 37 is open to the crankshaft case, with a pressure almost equals to atmosphere pressure. As the upper cylinder pressure Peav is higher than the atmosphere pressure, the EAV piston 33 is held down to the bottom side of lower EAV cylinder 35 due to the pressure difference. As a result, the EAV 16 is closed. The working fluid transfer passage 39 is cut off by EAV piston 33. In most of the time, both switching valve 31 and check valve 40 are shut off.

Referring now to FIG. 13, an operation diagram of EAV inside HEIHE in accordance with the present invention is shown, with the crankshaft angle of HEIHE is at the power strokes of either 540 minus Theta or 900 minus Theta degree CA, that is, Theta degree before BC. The first piston 17 is moving downward beyond the opening of exhaust duct 37. At this moment, the expanding exhaust gas has higher pressure than upper EAV cylinder pressure Peav. It would rush into the exhaust duct 37, pushing EAV driving head 36 as well as EAV piston 33 upward. Thus EAV 16 begins to open. As a result of EAV piston 33 moving upward, upper EAV cylinder pressure becomes higher than Peav. So the check valve 40 is forced to open, pumping the gas from upper EAV cylinder 32 into EAV pressure chamber 10. The vent 38 feeds the crankshaft air into the lower EAV cylinder 35.

Figure 14:
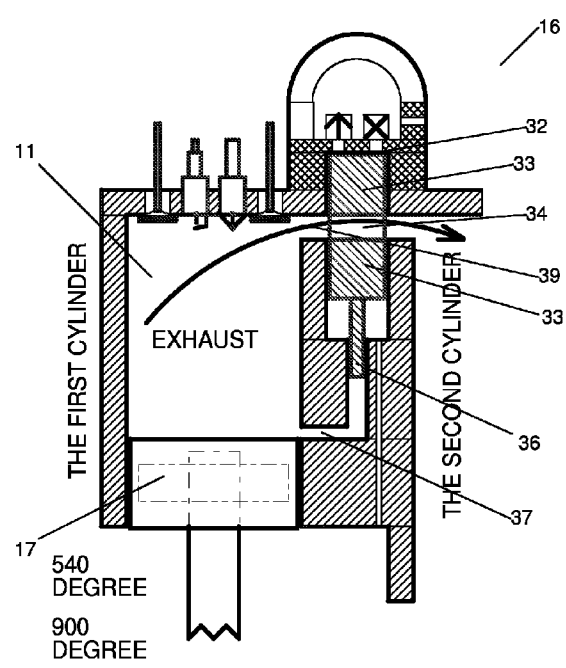
FIG. 14 is an operation diagram of exhaust actuated valve (EAV) of HEIHE in accordance with the present invention, with its crankshaft angle at 540 degree or 900 degree after starting point.

Referring now to FIG. 14, an operation diagram of EAV inside HEIHE in accordance with the present invention is shown, with the crankshaft angle of HEIHE is at the end of power strokes of either 540 or 900 degree CA. The first piston 17 has reached BC, making the exhaust duct 37 fully open to the cylinder. At this moment, the expanding exhaust gas has already pushed EAV driving head 36 as well as EAV piston 33 upward to the topside of the upper EAV cylinder 32. As a result, EAV 16 is fully open. The fluid inside the first cylinder 11 could now be discharged through working fluid transfer passage 39 and EAV piston opening 34.

Figure 15:
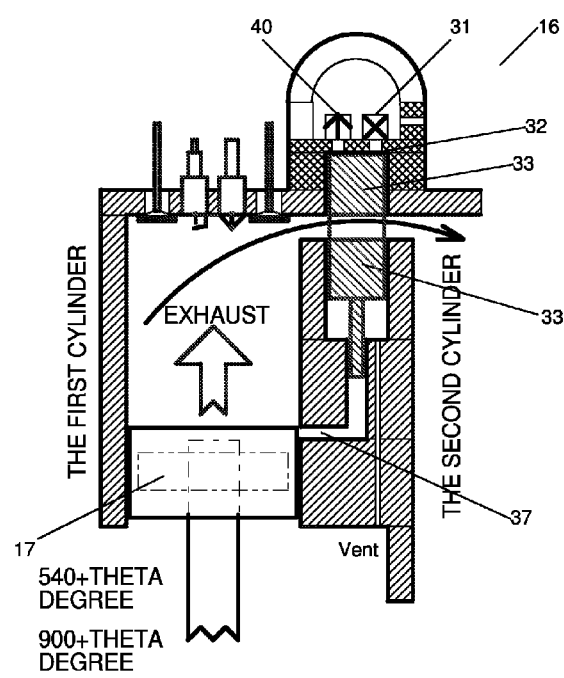
FIG. 15 is an operation diagram of exhaust actuated valve (EAV) of HEIHE in accordance with the present invention, with its crankshaft angle at 540 plus Theta degree or 900 degree plus Theta after starting point.

Referring now to FIG. 15, an operation diagram of EAV inside HEIHE in accordance with the present invention is shown, with the crankshaft angle of HEIHE is at the exhaust strokes of either 540 plus Theta or 900 plus Theta degree CA, that is, Theta degree after BC. The first piston 17 is moving upward beyond the opening of exhaust duct 37. At this moment, the pressure inside exhaust duct 37 begins to reduce to crankshaft pressure gradually. But the EAV piston 33 would be held at the top side of the upper EAV cylinder 32 by vacuum. This vacuum comes from the cutting off of both switching valve 31 and check valve 40. So EAV 16 is kept open for working fluid transfer.

Figure 16:
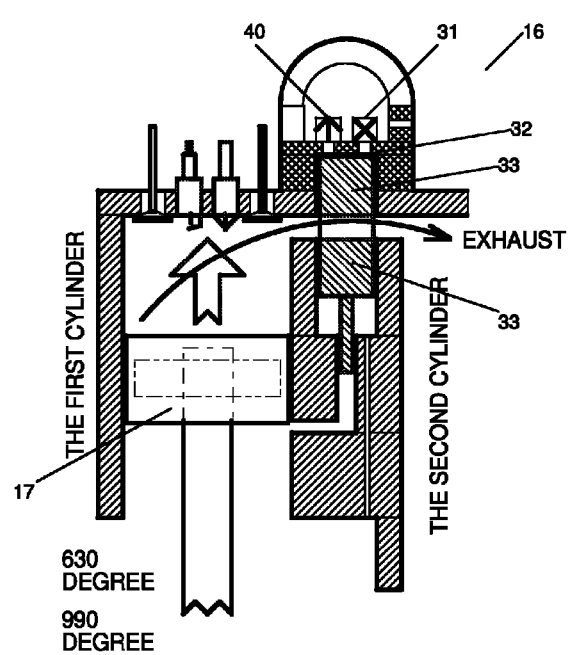
FIG. 16 is an operation diagram of exhaust actuated valve (EAV) of HEIHE in accordance with the present invention, with its crankshaft angle at 630 degree or 990 degree after starting point.

Referring now to FIG. 16, an operation diagram of EAV inside HEIHE in accordance with the present invention is shown, with the crankshaft angle of HEIHE is at the exhaust strokes of either 630 or 990 degree CA. The first piston 17 is moving upward. At this moment, the exhaust duct pressure has been reduced to crankshaft pressure. But the EAV piston 33 would be kept holding at the top side of the upper EAV cylinder 32 by vacuum. Both switching valve 31 and check valve 40 keep cutting off. So EAV 16 is kept open for continuous working fluid transfer.

Figure 17:
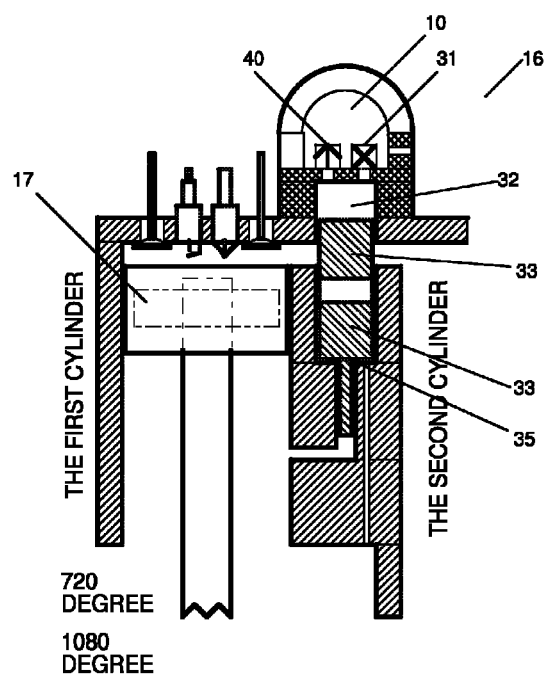
FIG. 17 is an operation diagram of exhaust actuated valve (EAV) of HEIHE in accordance with the present invention, with its crankshaft angle at 720 degree or 1080 degree after starting point.

Referring now to FIG. 17, an operation diagram of EAV inside HEIHE in accordance with the present invention is shown, with the crankshaft angle of HEIHE is at the end of exhaust strokes of either 720 or 1080 degree CA. The first piston 17 has reached TC, completing the exhaust stroke. At this moment, a reset pulse generated by HEIHE's microcomputer drives the switching valve 31 open. As a result, the pressured air from EAV pressure chamber 10 rushes into the upper EAV cylinder 32, pushing EAV piston 33 downward. So EAV 16 is closed again. Once EAV piston 33 goes down to the bottom side of lower EAV cylinder 35, the reset pulse applied to switching valve 31 could be removed. Thus switching valve 31 is shut off. But the positive pressure Peav would keep EAV 16 closed until the next exhaust stroke.

Figure 18:
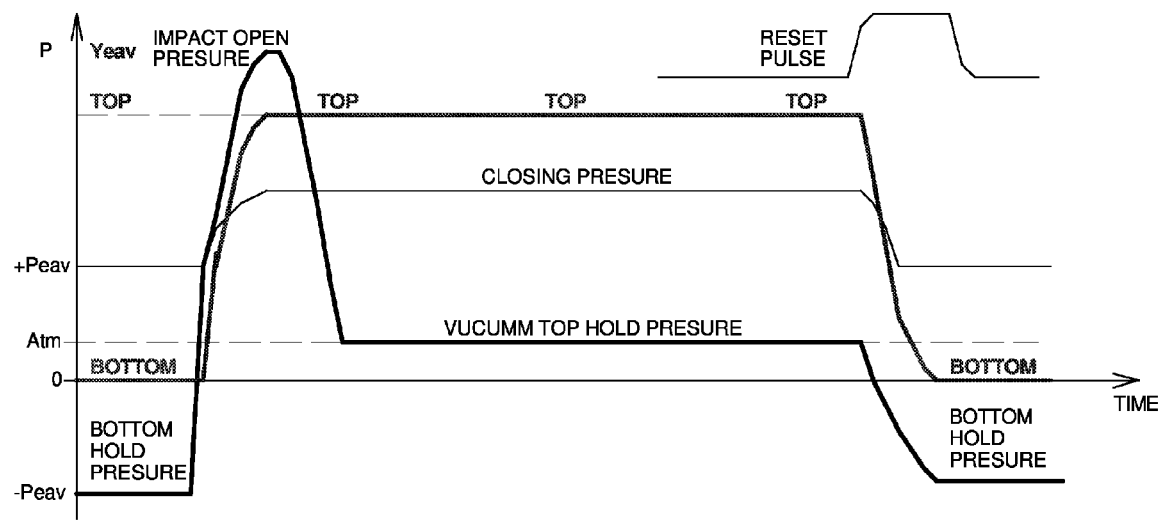
FIG. 18 is an operating pressure difference and vertical displacement diagram of exhaust actuated valve (EAV) of HEIHE in accordance with the present invention.

A waveform diagram of the above EAV actuation process in accordance with the present invention is shown in FIG. 18. It shows us the relationship between the operating pressure difference and the EAV vertical displacement.

EAV doesn't consume mechanical power like those mechanical lifting valves inside the conventional ICE, nor consumes electrical power like electromagnetic valves. It makes use of exhausting gas energy that would be discharged, leaving more valuable engine mechanical power to drive the load. This would definitely contribute to engine mechanical efficiency improvement. Further, it could be built between twin cylinders, shortening the working fluid transfer channel. As a result, thermodynamic efficiency would also be increased. The only problem is a small portion of its working fluid exhaust gas would be released into the crankshaft case. However, this phenomenon would benefit to EGR, Exhaust Gas Recirculation. Used exhaust gas discharged from EAV would have been cooled down by heat absorption of engine body during exhaust stroke, resulting a cooler EGR. Cooler EGR would contribute positive gain toward fuel conversion efficiency as well as emission control.

Although EAV is energy efficient, it needs exhaust energy to operate. So it could only be utilized as exhaust valve. Other non-exhaust valves may use other kinds of valves instead of EAV. In this case, electromagnetically actuated valves could be the best choice. They could not only be controlled by computer, but also provide fast control responds and valve timing flexibility. Such nice feature would be helpful to improve fluid volumetric efficiency dynamically. Their camless actuation could save mechanical power loss by friction, enhancing mechanical efficiency of HEIHE. At last, conventional camshaft actuated valves could also be used, but valve timing flexibility and mechanical efficiency would be suffered.

Figure 19:
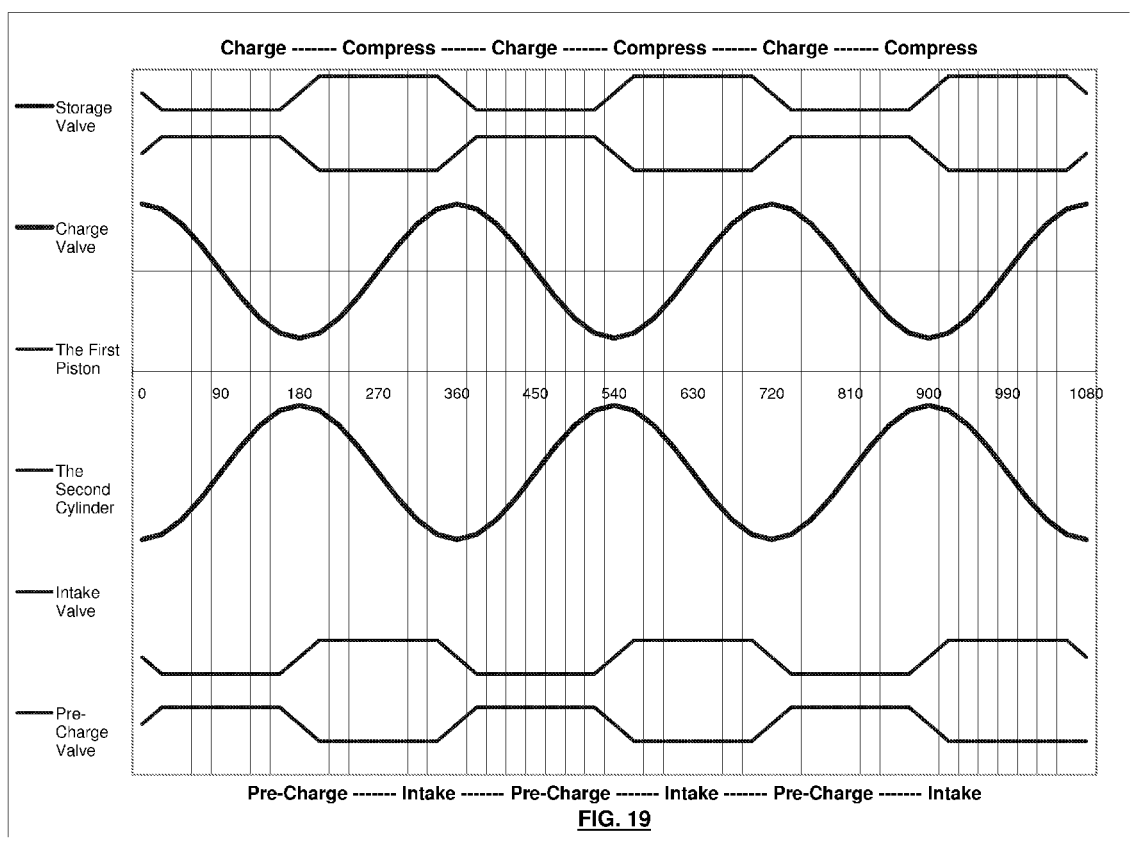
FIG. 19 is a sequence of events diagram of HEIHE working at air compression (AC) mode in accordance with the present invention.

FIG. 19 is a sequence of events diagram of HEIHE working at air compressor (AC) mode in accordance with the present invention, where piston displacements and valve movements are shown along with the crankshaft angle. During air compressor (AC) mode, HEIHE works as a two-stage AC, with the second (larger) cylinder working at primary compression stage, while the first (smaller) cylinder working at secondary compression stage. The compressed air pressure is lower after the primary compression stage, but would be pumped higher after the secondary compression stage. AC mode needs only 4 strokes scheduled in 2 periods, covering 360 degree of crankshaft rotation. Thus in a full HEIHE working cycle of 3 complete revolutions, or 1080 degree CA, the AC would complete 3 AC working cycles repeatedly. The related 4 strokes could be listed as follows:

1] The first period, from 180 degree to 360 degree CA, intake stroke in the second cylinder, with the second piston moves down from TC to BC; compression stroke in the first cylinder, with the first piston moves up from BC to TC. Both intake valve 25 and storage valve 12 open during this period.

2] The second period, from 360 degree to 540 degree CA, pre-charge stroke in the second cylinder, with the second piston moves up from BC to TC; and charge stroke in the first cylinder, with the first piston moves down from TC to BC. Both pre-charge valve 22 and charge valve 15 open during this period.

Figure 20:
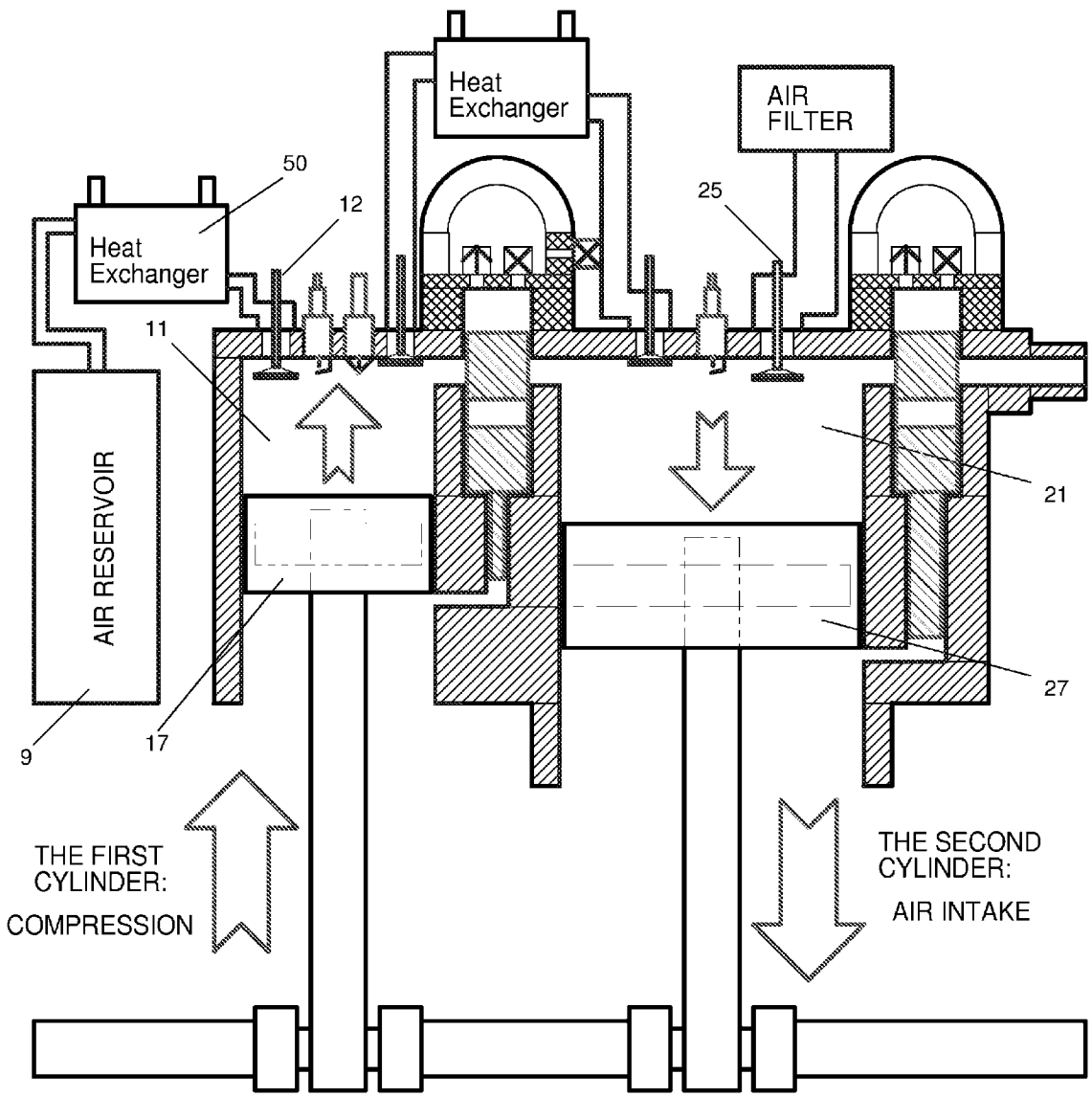
FIG. 20 is an operation diagram of HEIHE working at air compression (AC) mode in accordance with the present invention, with its crankshaft angle at 270 degree after starting point.

Now referring to FIG. 20, an operation diagram of HEIHE in accordance with the present invention is shown, with the crankshaft angle of HEIHE is at the first period of AC mode, 270 degree CA. The second piston 27 is moving downward while the first piston 17 is moving upward. Intake valve 25 is open, so the fresh air is sucking into the second cylinder 21. Storage valve 12 is also open, so the previously compressed air from previous working cycle is further compressed from the first cylinder 11 into air storage reservoir 9 trough a first heat exchanger 50. This completes the secondary stage of two-stage air compression. Other valves would remain closed. During this period, both intake stroke and compression stroke happen in the second cylinder and the first cylinder respectively.

Figure 21:
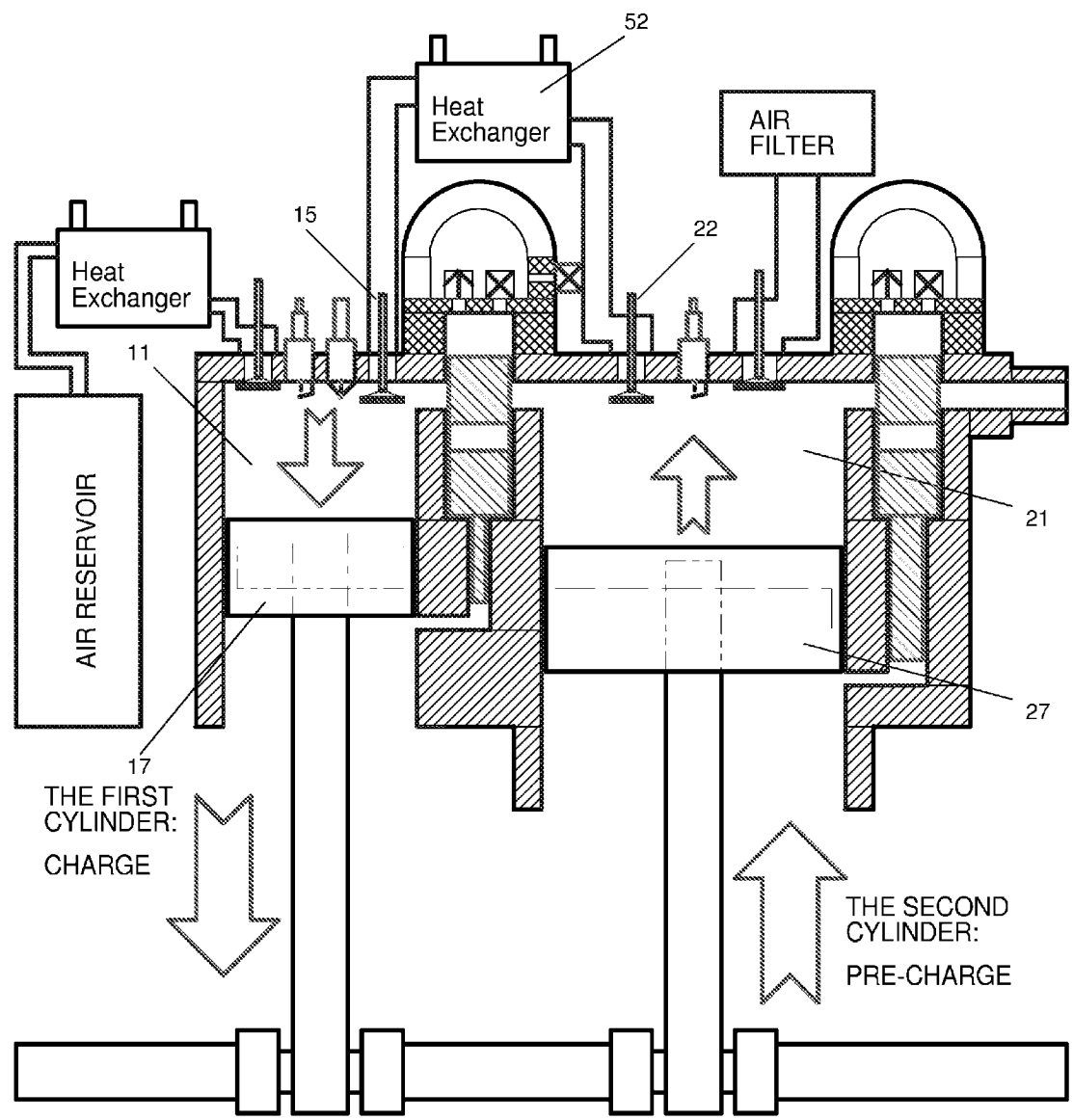
FIG. 21 is an operation diagram of HEIHE working at air compression (AC) mode in accordance with the present invention, with its crankshaft angle at 450 degree after starting point.

Referring now to FIG. 21, an operation diagram of HEIHE in accordance with the present invention is shown, with the crankshaft angle of HEIHE is at the second period of AC mode, 450 degree CA. The second piston 27 is moving upward while the first piston 17 is moving downward. Precharge valve 22 is open, so the fresh air inside the second cylinder 21 is pre-charged into the first cylinder 11 trough a second heat exchanger 52. Charge valve 15 is also open, so the pressure increasing pre-charged air from the second cylinder 21 is charging into the first cylinder 11. Since the first cylinder 11 has smaller volume than that of the second cylinder 21, the fresh air transferred from the second cylinder 21 into the first cylinder 11 is compressed. This completes the primary stage of two-stage air compression. Other valves would remain closed. During this period, both pre-charge stroke and charge stroke happen in the second cylinder and the first cylinder respectively.

Figure 22:
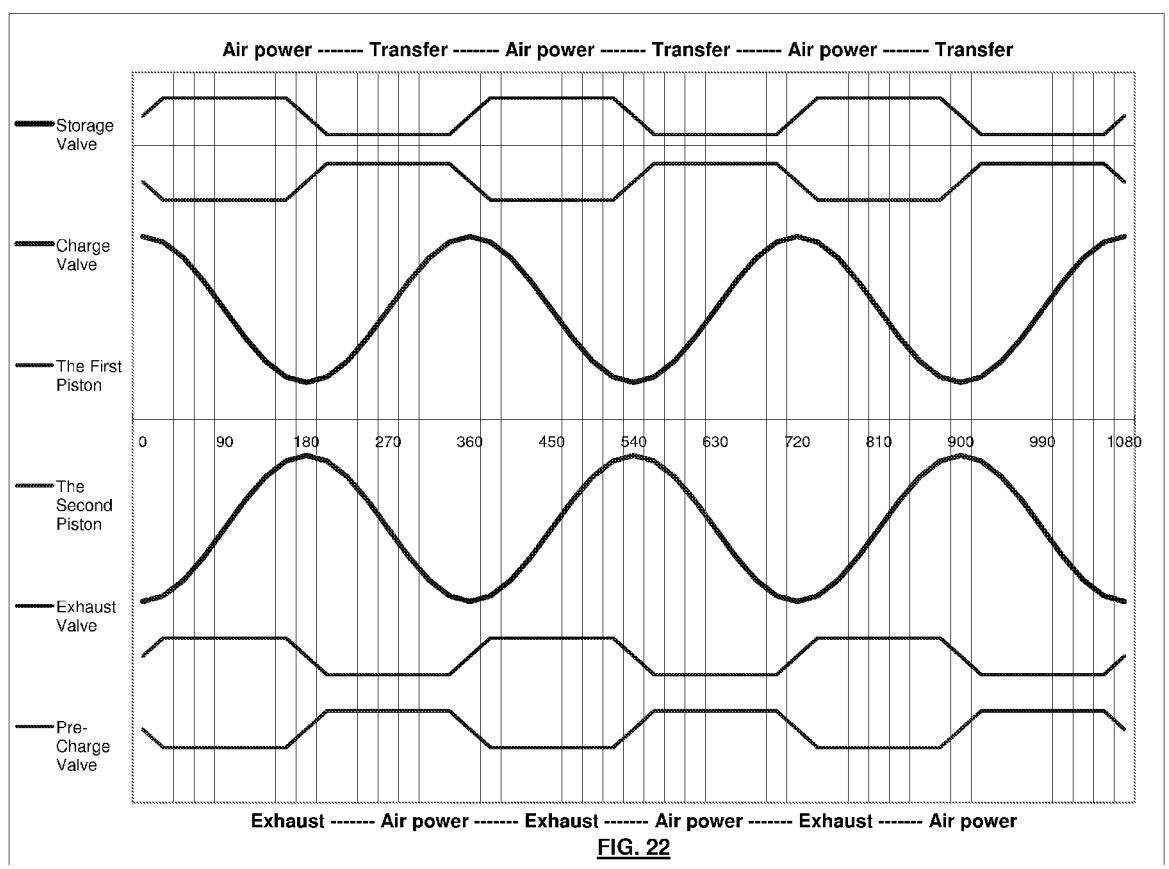
FIG. 22 is a sequence of events diagram of HEIHE working at compressed air engine (CAE) mode in accordance with the present invention.

FIG. 22 is a sequence of events diagram of HEIHE working at compressed air engine (CAE) mode in accordance with the present invention, where piston displacements and valve movements are shown along with the crankshaft angle. During compressed air engine (CAE) mode, HEIHE works as a two-stage CAE, with the first (smaller) cylinder working at primary expansion stage, while the second (larger) cylinder working at secondary expansion stage. The compressed air pressure is higher toward the primary expansion stage, but would become lower toward the secondary expansion stage. To the present invention of HEIHE, compressed air engine (CAE) mode is simply the mechanically inversed operation mode of air compressor (AC) mode. CAE mode needs only 4 strokes scheduled in 2 periods, covering 360 degree of crankshaft rotation. Thus in a full HEIHE working cycle of 3 complete revolutions, or 1080 degree CA, the CAE would complete 3 CAE working cycles repeatedly. The related 4 strokes could be listed as follows:

1] The first period, from 0 degree to 180 degree CA, primary CAE power stroke in the first cylinder, with the first piston moves down from TC to BC; CAE exhaust stroke in the second cylinder, with the second piston moves up from BC to TC. Both storage valve 12 and exhaust valve (EAV) 26 open during this period.

2] The second period, from 180 degree to 360 degree CA, CAE transfer stroke in the first cylinder, with the first piston moves up from BC to TC; and secondary CAE power stroke in the second cylinder, with the second piston moves down from TC to BC. Both charge valve 15 and pre-charge valve 22 open during this period. Inter-cylinder transfer valve 16 will not open during this period.

Figure 23:
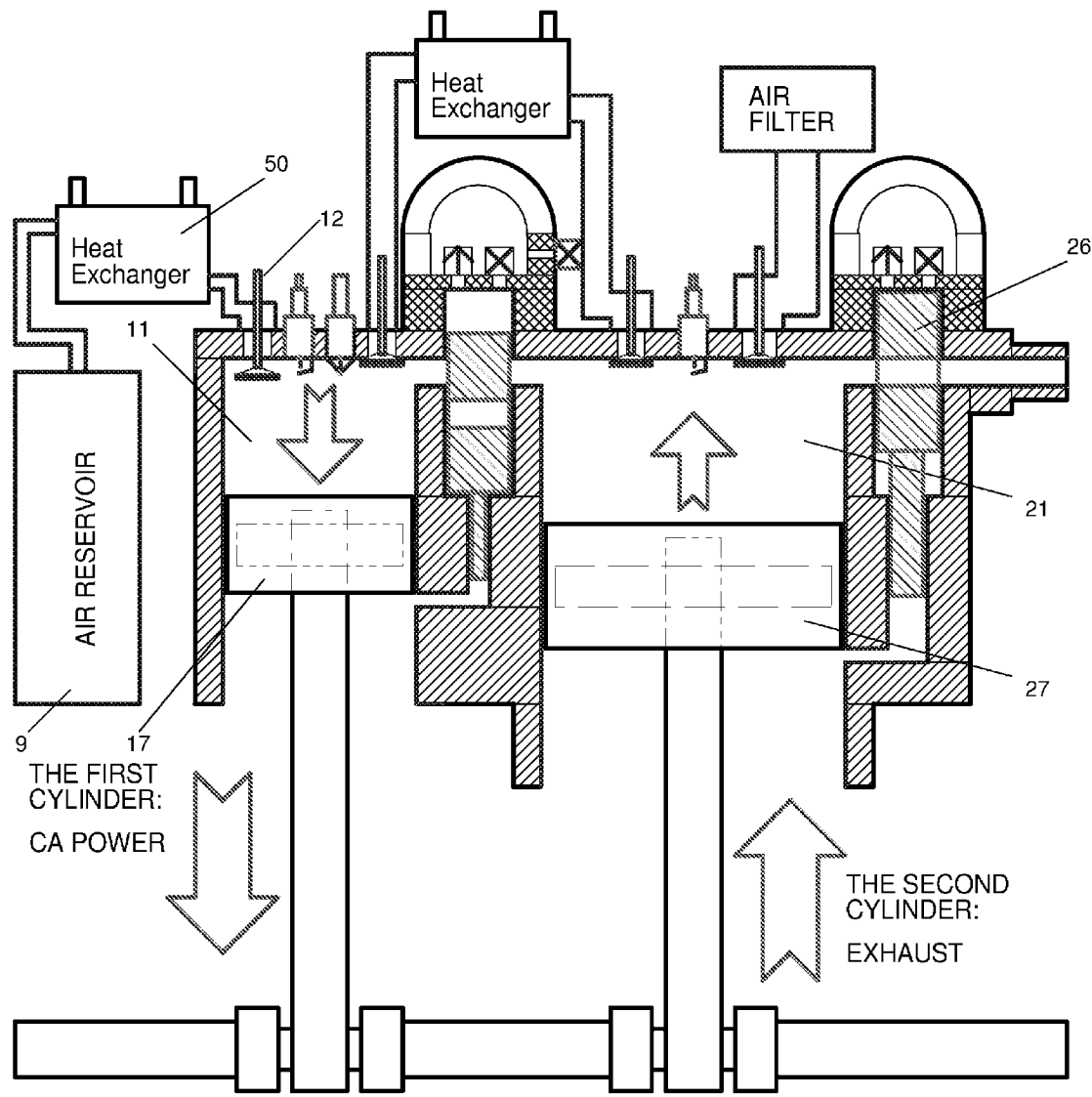
FIG. 23 is an operation diagram of HEIHE working at compressed air engine (CAE) mode in accordance with the present invention, with its crankshaft angle at 90 degree after starting point.

Now referring to FIG. 23, an operation diagram of HEIHE in accordance with the present invention is shown, with the crankshaft angle of HEIHE is at the first period of CAE mode, 90 degree CA. The first piston 17 is moving downward while the second piston 27 is moving upward. Storage valve 12 is open, so the compressed air stored inside the air reservoir 9 is fed into the first cylinder 11 through the first heat exchanger 50, forcing the first piston 17 moving down. Exhaust valve (EAV) 26 is also open, so the previously expanded compressed air from previous working cycle is exhausted from the second cylinder 21 to outside of HEIHE. This completes the primary stage of two-stage compressed air expansion. Other valves would remain closed. During this period, both primary CAE power stroke and CAE exhaust stroke happen in the first cylinder and the second cylinder respectively.

Figure 24:
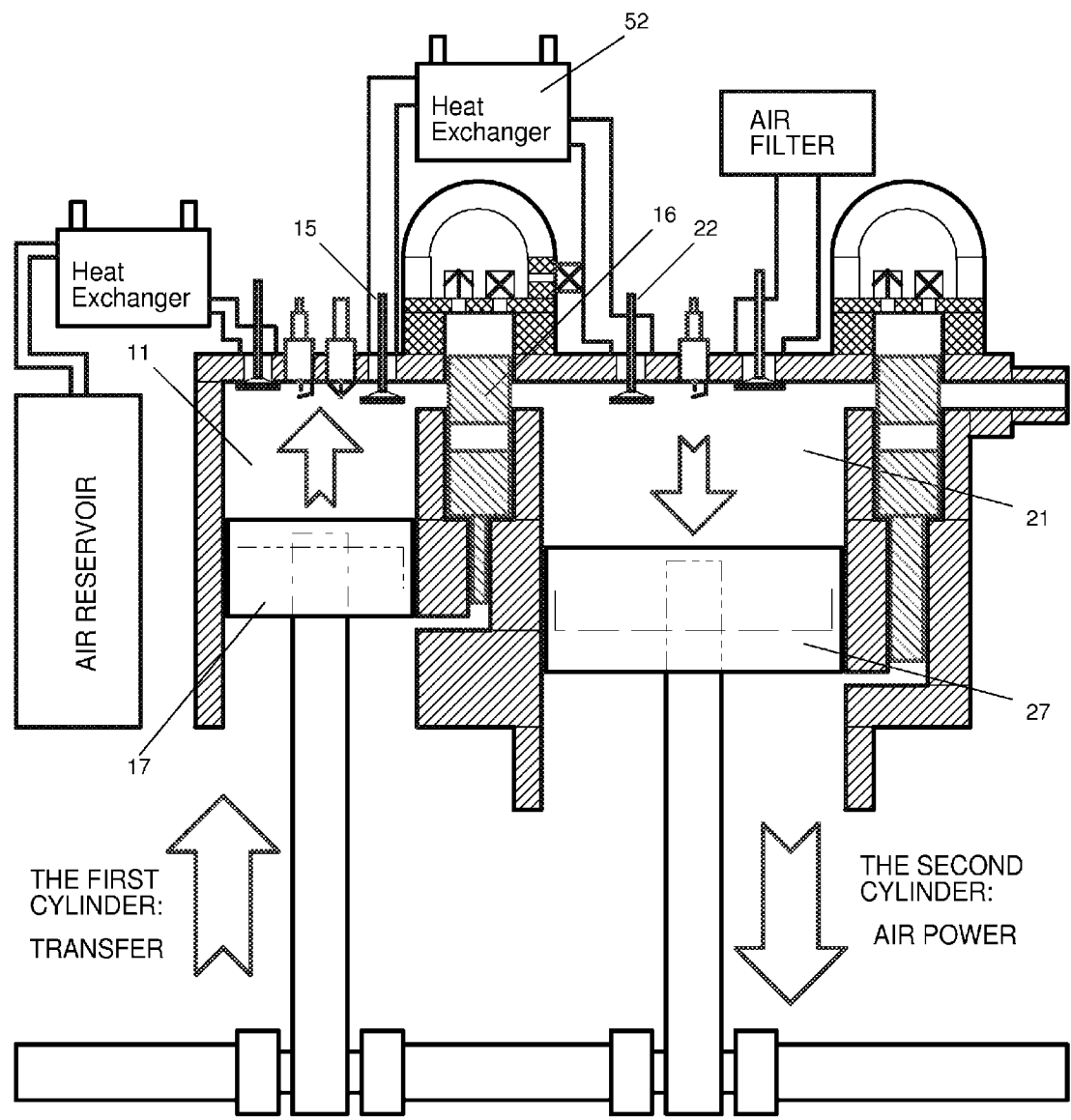
FIG. 24 is an operation diagram of HEIHE working at compressed air engine (CAE) mode in accordance with the present invention, with its crankshaft angle at 270 degree after starting point.

Referring now to FIG. 24, an operation diagram of HEIHE in accordance with the present invention is shown, with the crankshaft angle of HEIHE is at the second period of CAE mode, 270 degree CA. The first piston 17 is moving upward while the second piston 27 is moving downward. Inter-cylinder transfer valve (EAV 16) is closed and disabled in advance, but both charge valve 15 and pre-charge valve 22 are open. So the expanded air inside the first cylinder 11 is transferred to the second cylinder 21 trough the second heat exchanger 52. Since the second cylinder 21 has larger volume than that of the first cylinder 11, the expanded compressed air transferred from the first cylinder 11 into the second cylinder 21 is further expanded, forcing the second piston 27 moving down. This completes the secondary stage of two-stage air expansion. Other valves would remain closed. During this period, both CAE transfer stroke and secondary CAE power stroke happen in the first cylinder and the second cylinder respectively.

During the process of air compression, heat would be generated and the temperature of compressed air would be increased. This would decrease air storage capacity and reduce AC mode efficiency. In other side, during the process of compressed air expansion, heat would be absorbed and the temperature of compressed air would be decreased. This would decrease volumetric capacity of the compressed air and reduce CAE mode efficiency. So two-stage heat exchangers 50 and 52 could be utilized to cool down the compressed air during the AC mode, and to heat up the compressed air during the CAE mode. In order to store heat energy generated during the AC mode for later use during the CAE mode, a thermos tank could be used to collect heat energy during the AC mode, to store heat energy during the idle mode, and to release heat energy during the CAE mode. As a result, thermal efficiencies during both AC mode and CAE mode would be improved, and the heat loss would be captured for air hybrid power regeneration.

Figure 25:
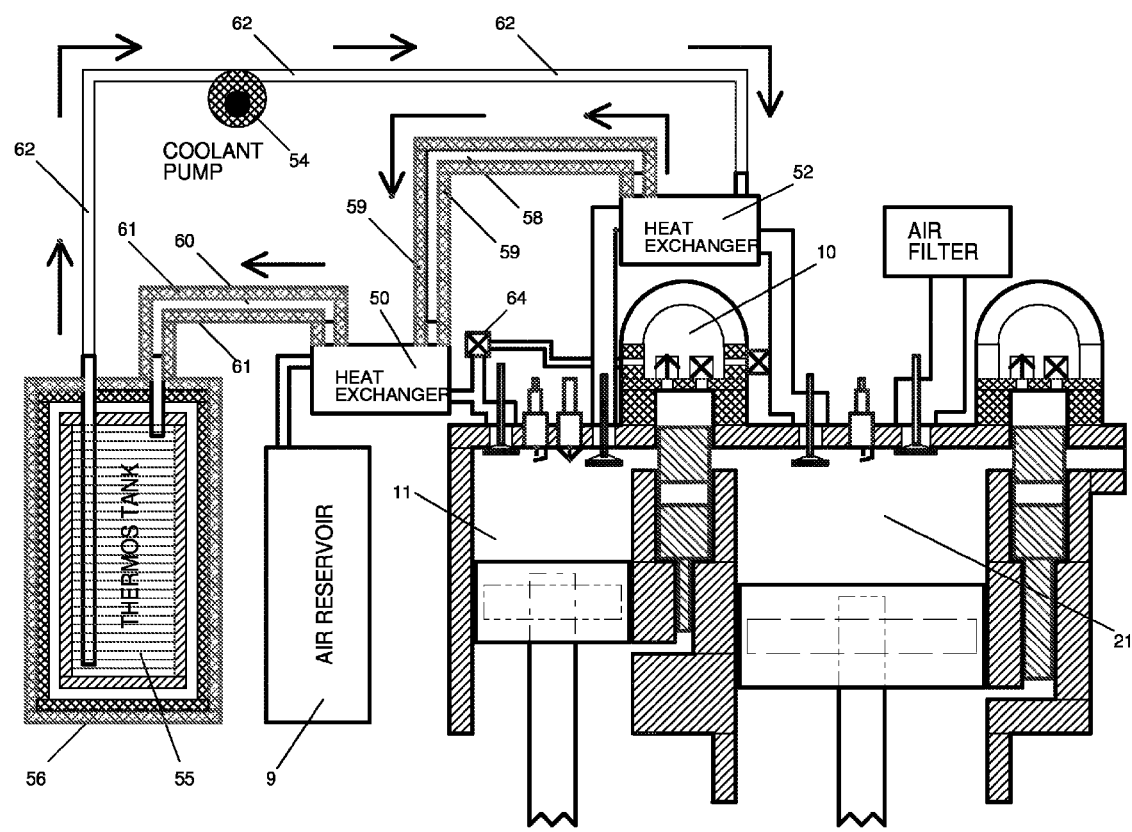
FIG. 25 is a pneumatic storage and thermal storage system diagram of HEIHE supporting both AC mode and CAE mode in accordance with the present invention.

Now referring to FIG. 25, a heat circulation diagram of HEIHE in accordance with the present invention is shown. A first heat exchanger 50 is installed between air reservoir 9 and the first cylinder 11. A second heat exchanger 52 is installed between the first cylinder 11 and the second cylinder 21. Both of the heat exchangers 50 and 52 are thermally cascaded with a coolant pump 54 and a thermos tank 56 filled with coolant 55, as to form a closed coolant circulation loop through coolant conduits 58, 60 and 62. The heated sections of the coolant conduits 58 and 60 would be covered by thermal insulations 59 and 61. During the AC mode, coolant pump 54 would force coolant to circulate clockwise, as shown by the arrows around the coolant conduits. The coolant 55 with lower temperature would come out of the bottom area of thermos tank 56, pass through coolant pump 54, enter the second heat exchanger 52, cooling down the compressed air discharged from the second cylinder 21. The coolant would then continue to flow into the first heat exchanger 50, cooling down the compressed air discharged from the first cylinder 11. At last, the heated coolant is fed back to the thermos tank 56 for heat energy storage. At meantime of the compressed air cooling down, the heat energy would be collected, transferred and stored into the thermos tank 56. During the CAE mode, the coolant loop would circulate in a reversed direction. Coolant pump 54 forces coolant running anti-clockwise (opposite to the shown arrow direction). The coolant 55 with higher temperature would come out of the top area of thermos tank 56, enter the first heat exchanger 50, heating up the compressed air to be fed into the first cylinder 11. The coolant would then continue to flow into the second heat exchanger 52, heating up the compressed air to be fed into the second cylinder 21. At last, the used coolant is fed back to the bottom of thermos tank 56 through coolant pump 54.

As a thermal energy storage device, thermos tank 56 could also be used to capture and store thermal energy from engine exhaust. CAE mode of HEIHE in accordance with the present invention would convert such restored thermal energy into mechanical power later.

Still in FIG. 25, switching valve 64 is utilized to regulate the compressed air flow between pressure chamber 10 and air reservoir 9. As has been mentioned previously, pressure chamber 10 requires a proper working pressure. If the pressure inside pressure chamber 10 becomes much higher than required, and/or when HEIHE does not need to consume most of the pre-charging air flow thus branching more fresh air into pressure chamber 10, then switching valve 64 would open electromagnetically to release the pressure, and to store pneumatic energy for later use. In case HEIHE is starting from stop, there is no enough working pressure inside pressure chamber 10, then switching valve 64 would also open as to feed pressure chamber 10 with a proper working pressure immediately by compressed air from air reservoir 9.

As we could see from the above, heating compressed air in two stages by stored heat energy would causes the working fluid expanding to much larger volume, thus obtaining much higher kinetic energy to do the expansion work. This could be an effective way to increase thermal efficiency of air hybrid braking power recovery.

The integration of both AC mode and CAE mode into HEIHE would make air hybrid vehicle drivetrain possible. The benefit of air hybrid drivetrain integrated inside HEIHE could require no on-board rechargeable energy storage system (RESS) like the one that dominates the electric hybrid drivetrain, where motor-generator and battery are required. This would not only greatly reduce the weight and complexity associated with the electric hybrid drivetrain integration, but also cut a sizable costs form motor-generator and battery. Technically, battery has limited energy density and constrained charging and discharging rate, therefore, it may not have enough capability to handle rapid energy exchange during regenerative braking. Battery also has a limited service life, usually shorter than the vehicle it serves. Electric hybrid would require 5 successive energy conversions to complete the energy regeneration loop—mechanical to electrical; electrical to chemical; chemical to chemical (energy storage); chemical to electrical; electrical to mechanical. Suppose each of the above conversions has an efficiency as high as 90%, then the overall regeneration loop efficiency would be 90% to the 5th power, or 59%. In contrast, air hybrid energy regeneration loop needs only 2 conversions—mechanical to pneumatic and pneumatic to mechanical. Suppose each of these 2 conversions has an efficiency of 81%, then the overall regeneration loop efficiency would be 81% times 81%, or 66%. So we could conclude that air hybrid has higher energy regeneration efficiency than that of electric hybrid, and the efficiency gain of air hybrid over electric hybrid would be at least 10%.

Moreover, energy regenerated by HEIHE would be stored in both air reservoir and thermos tank. The combination of these two storage devices could provide much larger energy density than that of rechargeable battery only in electric hybrid drivetrain. Compressed air at a pressure of 50 bar already has an energy density equivalent to up-to-date Lithium-ion Battery, and compressing the air pressure 4 times higher up to 200 bar would not be an unusual operation. In the other hand, if water-based coolant in a thermos tank could rise temperature for 53 degree Celsius, then its energy density is already equivalent to that of conventional nickel metal hydride battery (NiMH Battery), and rising coolant temperature for 4 times up to 212 degree Celsius would not be a difficulty action in case the coolant is oil-based. Due to lower specific heat value of oil-based coolant such as mineral oil, it still provides 3 times of heat capacity when being heated up to the same level. Obviously, energy storage density is a bottleneck of electric hybrid drivetrain. In the above energy density examples, 4 times of pneumatic energy plus 3 times of thermal energy would make energy density from regeneration energy storage system of HEIHE 7 times larger than that of chemical batteries. Therefore, the total possible energy density from regeneration energy storage system of HEIHE would be definitely superior to that of electric hybrid. This great feature of air hybrid powertrain could drive vehicle for longer mileage once fully charged before the next charge is required. If the charge is powered by household electrical power grid, then a long range "Plug-In" hybrid powertrain could be obtained. Another great feature of air hybrid powertrain could be, the dual energy storage devices involved would support double rate of energy exchange, absorbing sudden braking energy impact in a greater rate, and then releasing peak energy for vehicle to start from stop or to accelerate.

The last thing we need to count for in air hybrid drivetrain integrated inside HEIHE could be the heat exchangers. Obviously they are not 100% efficient, but they are dedicated to thermal to thermal conversion among fluids, their efficiency could be very high and their operation condition could be very desirable. Because they are naturally designed for thermal exchange. In contrast, their countpart in an electric hybrid drivetrain is power converter, which converts battery DC power to AC power required by drivetrain motors. Although the efficiency of power converter is very high but still not 100%. Suppose its efficiency is as high as 93%, then the rest of 7% energy would be lost in the format of heat. This unwanted heat could not only cause unexpected energy loss, but also cause overheat or even thermal breakdown of power electronics. As a result, a dedicated cooling system has to be applied to power converter, causing extra weight, cost and complexity. If the designer plans to smartly combine power converter cooling system with the existing ICE cooling system, then power converter and its electronics would work in a higher temperature, introducing more challenge and problem to solve. Obviously, thermal management is another bottleneck of electric hybrid drivetrain. Therefore, straight forward energy format in air hybrid drivetrain integrated inside HEIHE would have a natural advantage over that of electric hybrid drivetrain.

As has been mentioned during the descriptions of FIG. 10 and FIG. 11 previously, the combustible gases exist in the cylinders during the steam power strokes due to both thermal cracking and chemical cracking processes. These cracking processes may happen slowly and gradually along the steam power strokes. So multiple firing sparks must be applied to both of the cylinders during both primary and secondary steam power strokes. At least the firings should be made along the steam/fluid power strokes when the concentration of combustible gases reaches the highest point. During the further development, plasma discharge could also be applied into the cylinders, as to make extra volumetric expansion during the steam/fluid power strokes.

As has been mentioned during the description of FIG. 8 previously, secondary air-fuel combustion contributes to secondary air-fuel power stroke without consuming extra fuel. Thus fuel conversion efficiency would be greatly increased. More than that, the second cylinder could work as a thermal reactor that would remove gaseous pollutants from exhaust gases generated by primary air-fuel combustion. It is well known that even without a catalyst, hydrocarbons would be oxidized under a temperature in excess of 600 degree Celsius as long as it resides long enough in such a temperature. Carbon monoxide would also be oxidized over a temperature in excess of 700 degree Celsius. Such kind of temperature for secondary combustion could be very easy to obtain for a gasoline-fueled engine, since the exhaust temperature from the primary air-fuel combustion could be as high as 850 degree Celsius during high power operation.

Another well-known fact is that oxidation of combustible gases generates heat. For example, oxidation of 1.5% carbon monoxide would cause 220 degree Celsius temperature rise. As the oxidation and the accompany heat release is happened inside the second cylinder, their thermal energy would be captured and converted to useful mechanical power. To keep the oxidation process going on, we need not only to pre-store fresh air in the second cylinder, in which the pre-charge stroke happened in advance has provided such an action; but also to keep the reaction temperature high enough. In order to keep the reaction temperature high enough, fuel-rich combustion would be expected during the primary combustion process happened inside the first cylinder. Therefore, some kind of staged combustion method would be expected for the present invention. And, twin compound cylinder structure of HEIHE in accordance with the present invention would be a natural thermodynamic mechanism to implement such a staged combustion. It is no doubt that a thermodynamically and mechanically well-matched mechanical structure yields higher fuel conversion efficiency, and twin compound cylinders of HEIHE could definitely be such kind of mechanical structure.

Figure 26:
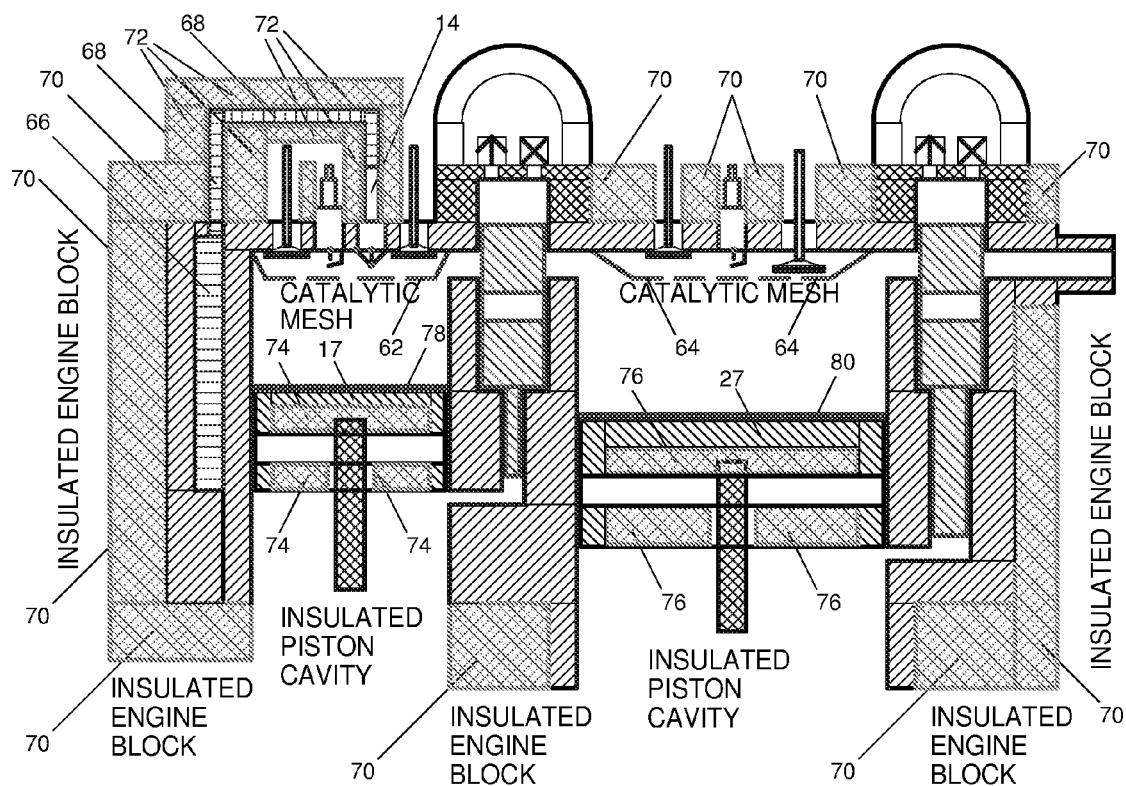
FIG. 26 is a thermodynamic structure diagram of HEIHE in accordance with the present invention, with its thermal insulated engine block and piston crown/cavity, water jacket as fluid super-heater and in-cylinder catalytic meshes.

Referring now to FIG. 26, a structure diagram of HEIHE with in-cylinder catalytic meshes and engine block thermal insulation in accordance with the present invention is shown. Both cylinders of HEIHE have catalytic metal meshes 62 and 64 built into the combustion chamber. They are heated up to the temperature of combustion chamber during the air-fuel power strokes, and remain heated during the coming steam/fluid power strokes. These heated catalytic metals then would enhance the process of steam cracking into hydrogen and oxygen under high temperature of combustion chamber, and also to enhance the process of steam cracking and/or hydrocracking of unburned hydrocarbons. All of these cracking processes would result combustible gases that carry heat energy. In the other side, the heated catalytic metals would also promote the secondary combustion of air-fuel combustion products, or to further promote exhaust oxidation with fresh air, as to reduce exhaust emissions while harnessing heat energy released from the secondary combustion of air-fuel combustion products. All of those cracking processes happened in the first cylinder could also be repeated here in the second cylinder, if the temperature allows.

In other word, in-cylinder catalytic metal meshes 62 and 64 could be the result of integrating catalytic converter, a heat-releasing device inevitably used along with conventional ICE, into the present invention, HEIHE. This perfect integration not only contributes to reduce exhaust emissions, but also harnesses heat energy released from the secondary combustion and catalytic conversion. As a result, HEIHE would obtain another gain of efficiency, exhaust emission would be reduced to very low level that conventional off-engine catalytic converter may be greatly downsized, or even no longer required. This would also benefit to cost reduction.

Another benefit of combustion inside twin compound cylinders would be staged combustion, which intentionally makes primary combustion of richer air-fuel mixture in the first cylinder, and then the resulted burning products are fed into the second cylinder for a leaner secondary combustion. As we already learnt from FIG. 7 previously that the second cylinder has been scheduled to implement pre-charge stroke before turning to execute secondary air-fuel power stroke, so the fresh air has already been filled into the combustion chamber of the second cylinder with compressed pressure in advance, and also has been heated up by compression and the remaining heat from cylinder wall. Therefore, the remaining warm fresh air inside combustion chamber would become nature oxidizer for secondary combustion in the second cylinder, making the secondary combustion a lean burn. In this way, two-stage combustion could thus be implemented, which would further contribute to the gain of HEIHE fuel conversion efficiency.

In case of diesel or biodiesel combustion inside HEIHE disclosed in the present invention, soot and/or particulates that cause headache problems in conventional diesel-fueled ICE, could be processed by the staged combustion. Once soot and/or particulates were generated by primary combustion inside the first cylinder, they could be transferred with the exhaust into the second cylinder, where they would meet the remaining fresh air, being oxidized. Normally, diesel particulate matter would be ignited at about 500 to 600 degree Celsius. This is above the normal temperature of diesel exhaust discharged from the first cylinder (200 to 500 degree Celsius). However, with the help of in-cylinder catalytic meshes, the ignition temperature of diesel particulate matter would be reduced to about 200 degree Celsius. In this way, a large percentage of diesel particulate matter could be burned out. Post fuel injection that injects tiny fuel into the first cylinder at the end of primary air-fuel combustion and expansion stroke, may be utilized to enhance the secondary combustion. As a result, diesel particulate matter would be fully oxidized while the released thermal energy from oxidation would be captured by the second cylinder.

Still in FIG. 26, inter-cylinder heat conveying fluid jacket 66 could be built around the twin cylinders to keep the temperature of twin cylinders in balance. It also could heat up the fluid to be injected into the first cylinder as a fluid superheater. A fluid conduit 68 would connect the fluid jacket 66 with fluid injector 14. The fluid jacket 66 would absorb the heat escaping from the cylinder wall, and heat up the fluid to be injected into super-heated state. As a result, the escaped heat energy could be recaptured and fed back into the cylinder for doing further work, obtaining super-heated steam/fluid expansion power. This is also another gain factor of HEIHE fuel conversion efficiency.

Still in FIG. 26, in order to increase thermal efficiency and to reduce heat loss from engine body, the surface of engine block could be covered with thermal insulations 70. The super-heated fluid conduit 68 could also be coated with thermal insulation 72. Further, the crowns and cavities of both pistons 17 and 27 could also be filled with lightweight thermal insulation material 74 and 76, as to preventing heat loss from both top and bottom of the pistons. Stainless steal has relative smaller heat conductivity but larger heat resistance and mechanical toughness, could become an idea insulation material for piston crowns 78 and 80. At last, the connecting rods could even be made of less heat-conductive materials. All of these thermal insulation measures would definitely contribute to the gain of HEIHE fuel conversion efficiency.

FIG. 27 lists a table to summarize fuel conversion efficiency related to High Efficiency Integrated Heat Engine (HEIHE) in accordance with the present invention. The table shows up to 14 efficiency contributors that effect overall efficiency of HEIHE. Among these 14 efficiency contributors, 4 of them are related to power strokes that contribute to positive mechanical power output; another 4 of them are related to the structural improvements of HEIHE over conventional ICE; One large, unique contributor among 14 is air hybrid braking power regeneration; the last 4 smaller contributors among 14 are the improvements of HEIHE over conventional ICE in both combustion and thermodynamics areas; and the only negative contributor is supercharger which does not contribute very much to efficiency, but to power density of HEIHE system instead.

Still in FIG. 27, each efficiency contributor is listed in one line, with minimum efficiency and maximum efficiency as well as average efficiency respectively. Line 1 is primary air-fuel combustion and expansion. It takes the only power stroke of conventional ICE as a baseline, or a 100% relative efficiency as a starting point. So based on the efficiency of modern conventional ICE, 25% is entered as minimum efficiency while 30% is entered as maximum efficiency. Line 2 is secondary air-fuel combustion and expansion. It has 20% to 22% of efficiency gain to the baseline. Line 3 is primary steam/fluid expansion. It has 35% to 40% of efficiency gain to the baseline. Line 4 is secondary steam/fluid expansion. It has 20% to 22% of efficiency gain to its primary stroke, Line 3. Line 5 to Line 8 are contributed by removing cooling system; Exhaust Actuated Valves (EAV); Injective Supercharger and Evaporative Intercooler respectively. They are estimated to be 2% to 3% of overall efficiency increment each. Line 9 is from air hybrid braking power regeneration. Based on the efficiency gain of existing electric hybrid drivetrain over conventional ICE, 20% to 30%, it is reasonable to add 10% more as the efficiency gain of air hybrid drivetrain integrated inside HEIHE, resulting 22% to 33% efficiency gain to the baseline. Line 10 to Line 13 are contributed by In-Cylinder Catalytic Meshes; Staged Combustion; Super Heated Water Jacket and Engine Body Thermal Insulation respectively. They are estimated to be 1% to 2% of overall efficiency increment each. Line 14 is the subtotal efficiency among the above 13 lines, resulting 58.00% of minimum subtotal efficiency, 81.14% of maximum subtotal efficiency as well as 69.57% of average subtotal efficiency. Next, Line 15 reflects the negative efficiency contribution of Supercharger Power Consumption, minus 20% to minus 15% to the subtotal efficiency of Line 14. Line 16 is the total efficiency of HEIHE from Line 14 less Line 15, resulting 46.60% of minimum total efficiency, 68.97% of maximum total efficiency as well as 57.68% of average total efficiency. Line 17 compares the total efficiency of HEIHE with the baseline efficiency from Line 1, resulting 1.86 times of minimum total efficiency gain, 2.30 times of maximum total efficiency gain as well as 2.08 times of average total efficiency gain. Line 18 shows the total efficiency percentage gain over baseline conventional ICE efficiency from Line 1, resulting 85.60% of minimum total efficiency gain, 129.90% of maximum total efficiency gain as well as 107.75% of average total efficiency gain. Therefore, we could confidently conclude that the total fuel conversion efficiency from HEIHE, as the name implies, is at least one fold over, or doubled based on, that of conventional ICE.

Figure 28:
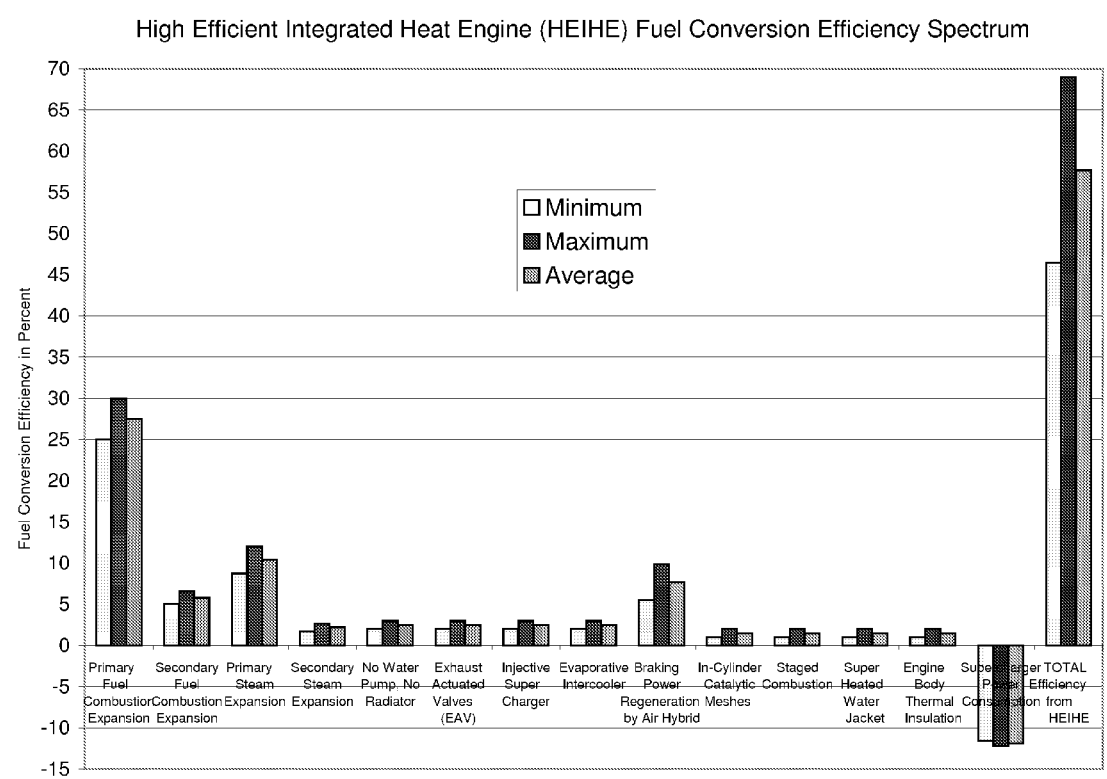
FIG. 28 is a chart of fuel conversion efficiency spectrum of HEIHE in accordance with the present invention.

Referring now to FIG. 28, a fuel conversion efficiency spectrum from High Efficient Integrated Heat Engine (HEIHE) is shown in accordance with the present invention. In this fuel conversion efficiency spectrum chart all the efficiency contributors listed in FIG. 27 are shown with their amounts of efficiency contributions indicated by the magnitudes of the vertical bars. The summation of all the efficiency contributors, or the total fuel conversion efficiency from HEIHE, is shown at the rightmost side of the chart. Obviously and conclusively, HEIHE disclosed in the present invention possesses double fuel conversion efficiency over that of conventional ICE.

Advantageously, the present invention could revolutionize the conventional ICE we used to. Firstly, the present invention could reduce fuel consumption of future vehicles and power plants, basically due to higher fuel conversion efficiency. Secondly, the present invention could greatly reduce engine emissions due to staged combustion and secondary catalytic combustion. Thirdly, the present invention could result higher power density of future vehicles and power plants, because multiple power strokes have been integrated into one engine body. Higher power density means smaller engine size and weight, or more power based on the same engine size and weight. Fourthly, the HEIHE in the present invention could be very easy to implementation that it bears piston-in-cylinder structure of conventional ICE and has no over complicated engine architecture. Fifthly, the present invention could cause lower cost to build engines of future vehicles and power plants, because there is no expensive structure and parts involved. Sixthly, the present invention could be easily integrated with a "Plug-In" hybrid powertrain. And lastly, the HEIHE in the present invention could be of multiple-fuel compatible, as variable compression ratio is easy to build in and staged combustion would be tolerant to wider range of air-fuel ratios.

Finally, the present invention could greatly contribute to the mankind with double engine fuel conversion efficiency. Double efficiency means less fuel consumption. Double efficiency means double fuel economy. Double efficiency means double energy. Double efficiency results cleaner environment. Double efficiency implies greater energy independent. Double efficiency results greater fossil fuel reserve. During the era of fossil fuel economy, double efficiency means stronger economy. The present invention could benefit the whole world or wherever a fuel combustion power generating engine is required, from civil automobiles to military vehicles; from engineering power horses to industry power plants; from garden tools to ocean-going vessels. The present invention could definitely meet the requirement set by California Global Warming Solutions Act 2006 (AB 32), also meet the challenge of Advanced Energy Initiative (AEI) announced by President Bush, follow the direction of Energy Act of 2007 (HR 6) signed by President Bush, and follow the guideline proposed by FreedomCAR and Vehicle Technologies (FCVT) R&D programs of US Department of Energy.

It is believed that the High Efficient Integrated Heat Engine (HEIHE) of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the future claims to encompass and include such changes.

What is claimed is:

1. A method for operating integrated heat engine comprising:
   operating the engine with compound cycle;
   operating the engine with combined cycle;
   integrating both compound cycle and combined cycle into single engine body;
   applying multiple working fluids into single engine body;
   constructing the engine with compound cylinder structure;
   combusting fuel inside twin compound cylinders;
   applying compound combustions inside twin compound cylinders;
   expanding working fluids inside twin compound cylinders;
   applying compound expansions inside twin compound cylinders;
   applying staged-combustion inside twin compound cylinders;
   injecting working fluids into engine cylinders;
   transferring working fluids between twin compound cylinders;

acquiring mechanical power from multiple kinds of power strokes driven by expansions of multiple working fluids;

supercharging the engine by piston operation inside compound cylinders;

storing supercharged working fluid into intermediate storage container;

intercooling supercharged working fluid by evaporative intercooler;

spraying fuel into evaporative intercooler;

evaporating fuel inside evaporative intercooler;

integrating catalytic metal meshes into engine cylinders;

covering piston crowns with insulation materials;

covering engine body with insulation materials;

recovering exhaust heat energy with heat exchanger;

utilizing exhaust energy to actuate engine valves;

adopting pneumatic hybrid braking energy regeneration;

adopting compressed air as working fluid for energy regeneration;

working under multiple stage air compressor mode;

working under multiple stage compressed air engine mode;

cooling compressed air under air compressor mode;

heating compressed air under compressed air engine mode;

storing heat energy into vacuum insulated thermos tank under air compressor mode;

storing pneumatic energy into compressed air reservoir under air compressor mode;

releasing stored heat energy for energy regeneration under compressed air engine mode;

releasing stored pneumatic energy for energy regeneration under compressed air engine mode;

charging heat energy through "plug-in" to household electrical power source; and charging pneumatic energy through "plug-in" to household electrical power source.

2. The method according to claim 1, wherein said twin compound cylinder structure comprises at least one, but not limited to one, pair of twin compound cylinders;

wherein said twin compound cylinders comprise two adjacent cylinders, the first cylinder and the second cylinder;

wherein said twin compound cylinders are contained within single engine body;

wherein both the first cylinder and the second cylinder are cascaded for working fluid transfers;

wherein the volume of the second cylinder is larger than the volume of the first cylinder; and wherein said multiple working fluids comprise, but not limited to, air-fuel combustion products, steam, compressed air or liquid air.

3. The method according claim 1, wherein said compound combustions comprise primary air-fuel combustion in the first cylinder, and secondary air-fuel combustion in the second cylinder; and wherein said compound expansions comprise primary combustion products expansion in the first cylinder, and primary working fluids expansion in the first cylinder, as well as secondary combustion products expansion in the second cylinder, and secondary working fluids expansion in the second cylinder.

4. The method according to claim 1, wherein said multiple kinds of power strokes comprise at least your different kinds of power strokes driven by expansions of multiple working fluids:

(a) primary air-fuel power stroke—the primary air-fuel combustion and combustion products expansion in the first cylinder;

(b) secondary air-fuel power stroke—the secondary air-fuel combustion and combustion products expansion in the second cylinder;

(c) primary steam/fluid power stroke—the primary steam generation and/or working fluid expansion in the first cylinder; and (d) secondary steam/fluid power stroke—the secondary steam and/or working fluid expansion in the second cylinder.

5. The method according to claim 1, wherein the full working cycle of the engine comprises twelve (12) operation strokes scheduled in six (6) working periods, during each working period two (2) different operation strokes happen at the same time in both the first cylinder and the second cylinder respectively; and wherein said four different kinds of power strokes are included among said six (6) working periods, while only one of power strokes consumes the fuel.

6. The method according to claim 1, wherein the full working cycle of twelve (12) operation strokes scheduled in six (6) working periods comprises three (3) complete crankshaft revolutions, or 1080 degree crankshaft angle, each period comprising 180 degree crankshaft angle with two (2) of said twelve (12) operation strokes:

(a) the first period, charge stroke in the first cylinder, and steam/fluid exhaust stroke in the secondary cylinder;

(b) the second period, compression stroke in the first cylinder, and intake stroke in the second cylinder;

(c) the third period, primary air-fuel power stroke in the first cylinder, and pre-charge stroke in the second cylinder;

(d) the fourth period, air-fuel transfer stroke in the first cylinder, and secondary air-fuel power stroke in the second cylinder;

(e) the fifth period, primary steam/fluid power stroke in the first cylinder, and air-fuel exhaust stroke in the second cylinder; and (f) the sixth period, steam/fluid transfer stroke in the first cylinder, and secondary steam/fluid power stroke in the second cylinder.

7. The method according to claim 1, wherein one spark ignition is applied at the first cylinder during 300 degree to 400 degree of crankshaft angle; multiple spark ignitions are applied at the first cylinder during 720 degree to 990 degree of crankshaft angle; multiple spark ignitions are applied at the second cylinder during 900 degree to 1080 degree of crankshaft angle; one or multiple fluid injections are applied at the first cylinder during 540 degree to 900 degree of crankshaft angle; and wherein the fluid to be injected into the first cylinder is purified water, distilled water, compressed air or liquid air, water solution of ethanol, or even the mixture of said fluids.

8. The method according to claim 1, wherein said staged-combustion is implemented by applying different air-fuel ratios into said twin compound cylinders, with fuel-rich air-fuel mixture being applied firstly inside the first cylinder, and then, with oxygen-rich air-fuel mixture being applied secondly inside the second cylinder; and wherein pre-charged, pre-stored and pre-heated air inside the combustion chamber of the second cylinder provides additional oxidizer for secondary combustion, making secondary combustion an oxygen-rich lean burn.

9. The method according to claim 1, wherein said exhaust heat energy recovery is implemented by applying heat exchanger onto the exhaust output port of the engine for heating up the incoming working fluid such as steam or compressed air, with both of the incoming and output working fluids running in reversed flow directions.

10. The method according to claim 1, wherein said pneumatic hybrid braking power regeneration comprises working under air compressor mode during the process of vehicle deceleration and/or braking; working under compressed air engine mode during the process of vehicle acceleration and/or starting; utilizing compressed air as the working fluid for braking power regeneration; absorbing the heat energy regenerated by heat exchangers; storing energy regenerated in both air reservoir and thermos tank; and using a vacuum insulated coolant container as thermal storage tank.

11. The method according to claim 10, wherein said air compressor mode is two-stage air compression process, with the second cylinder working at primary compression stage, while the first cylinder working at secondary compression stage; a full working cycle of the air compressor mode comprises 4 strokes scheduled in 2 periods, covering 360 degree of crankshaft rotation:
   (a) the first period, intake stroke in the second cylinder, and compression stroke in the first cylinder; and
   (b) the second period, pre-charge stroke in the second cylinder, and charge stroke in the first cylinder.

12. The method according to claim 10, wherein said compressed air engine mode is two-stage compressed air expansion process, with the first cylinder working at primary expansion stage, while the second cylinder working at secondary expansion stage; a full working cycle of the compressed air engine mode comprises 4 strokes scheduled in 2 periods, covering 360 degree of crankshaft rotation:
   (a) the first period, primary compressed air engine power stroke in the first cylinder, and compressed air engine exhaust stroke in the second cylinder; and
   (b) the second period, compressed air engine transfer stroke in the first cylinder, and secondary compressed air engine power stroke in the second cylinder.

13. The method according to claim 10, wherein the stored energies can be pre-charged electrically through "plug-in" to household electrical power source;
   wherein the pneumatic energy charged into compressed air reservoir is sourced from either braking power regeneration, or "plug-in" to household electrical power source; and
   wherein the heat energy charged into thermos tank is sourced from either braking power regeneration, or "plug-in" to household electrical power source.

14. An integrated heat engine comprising:
means for operating the engine with compound cycle;
means for operating the engine with combined cycle;
means for integrating both compound cycle and combined cycle into single engine body;
means for applying multiple working fluids into single engine body;
means for constructing the engine with compound cylinder structure;
means for combusting fuel inside twin compound cylinders;
means for applying compound combustions inside twin compound cylinders;
means for expanding working fluids inside twin compound cylinders;
means for applying compound expansions inside twin compound cylinders;
means for applying staged-combustion inside twin compound cylinders;
means for injecting working fluids into engine cylinders;
means for transferring working fluids between twin compound cylinders;
means for acquiring mechanical power from multiple power strokes driven by expansions of multiple working fluids;
means for supercharging the engine by piston operation inside compound cylinders;
means for storing supercharged working fluid into intermediate storage container;
means for intercooling supercharged working fluid by evaporative intercooler;
means for spraying fuel into evaporative intercooler;
means for evaporating fuel inside evaporative intercooler;
means for integrating catalytic metal meshes into engine cylinders;
means for covering piston crowns with insulation materials;
means for covering engine body with insulation materials;
means for recovering exhaust heat energy with heat exchanger;
means for utilizing exhaust energy to actuate engine valves;
means for adopting pneumatic hybrid braking energy regeneration;
means for adopting compressed air as working fluid for energy regeneration;
means for working under multiple stage air compressor mode;
means for working under multiple stage compressed air engine mode;
means for cooling compressed air under air compressor mode;
means for heating compressed air under compressed air engine mode;
means for storing heat energy into vacuum insulated thermos tank under air compressor mode;
means for storing pneumatic energy into compressed air reservoir under air compressor mode;
means for releasing stored heat energy for energy regeneration under compressed air engine mode;
means for releasing stored pneumatic energy for energy regeneration under compressed air engine mode;
means for charging heat energy through "plug-in" to household electrical power source; arid
means for charging pneumatic energy through "plug-in" to household electrical power source.

15. An integrated heat engine comprising:
engine body holding a plurality of twin compound cylinders;
twin compound cylinder composed by both the first cylinder with a first piston and its connecting rod, and the second cylinder with a second piston and its connecting rod;
crankshaft mechanically coupled with both the first piston and the second piston through their connecting rods in a crankshaft angle difference from zero degree to 270 degree;
storage valve, spark plug, fluid injector and charge valve being installed on top of the first cylinder;
pre-charge valve, spark plug and intake valve being installed on top of the second cylinder;
at least one inter-cylinder working fluid transfer passage inserted between said twin compound cylinder;
at least one inter-cylinder working fluid transfer valve mounted onto the inter-cylinder working fluid transfer passage between said twin compound cylinder((s)); and at least one exhaust valve mounted between the second cylinder and exhaust port.

16. The engine according to claim 15, further comprising evaporative intercooler; fuel injector mounted onto the evaporative intercooler; air filter; injective supercharge pump and its check valve; supercharging fluid transfer passage; intermediate supercharging fluid storage container; means for utilizing evaporative intercooler as intermediate supercharging fluid storage container; means for injecting fuel spray into the chamber of evaporative intercooler; and means for regulating the pre-charging air flow to yield variable compound compression ratio of twin compound cylinders.

17. The engine according to claim 15, wherein both the first cylinder and the second cylinder comprise catalytic metal meshes built into their combustion chambers; means to make the second cylinder work as a thermal reactor, or gaseous pollutants remover: the crowns of both the first piston and the second piston are covered by thermal insulation materials; the cavities of both the first piston and the second piston are filled by light-weight thermal insulation materials; the outer surface of engine block is covered with thermal insulations, or by thermal coating.

18. The engine according to claim 15, wherein both the first cylinder and the second cylinder share one inter-cylinder heat conveying fluid jacket; the heat conveying fluid in said heat conveying fluid jacket is silicon oil, mineral oil or even engine lubricate oil; the heat conveying fluid is circulated passively, or forced actively by circulation pump running at the lower temperature section of the circulation loop; and fluid superheater is inserted into the hottest section of the conveying fluid jacket near the first cylinder.

19. The engine according to claim 15, wherein said inter-cylinder working fluid transfer valve and exhaust valve are implemented by piston valves actuated by exhaust energy, or by exhaust actuated valves (EAV) which comprise((s)) at least EAV pressure chamber, upper EAV cylinder, lower EAV cylinder, EAV piston with fluid transfer opening and its driving head, exhaust duct, vent hole, working fluid transfer passage, switching valve and check valve; and the switching valve is to be controlled by a microcomputer to reset EAV.

20. The engine according to claim 15, further comprising heat circulation loop; compressed air reservoir; the first heat exchanger and the second heat exchanger cascaded in two stages; fluid ducts for heat circulation; fluid duct insulations; bi-directional fluid circulation pump, and vacuum insulated thermos tank; means for utilizing silicon oil, mineral oil or even engine lubricate oil as heat conveying fluid; means for circulating heat conveying fluid from bottom of thermos tank to fluid circulation pump, to second heat exchanger, and to first heat exchanger, then return to top of thermos tank under the air compressor working mode; and means for circulating heat conveying fluid from top of thermos tank, to the first heat exchanger, to second heat exchanger, and to fluid circulation pump, then return to bottom of thermos tank under the compressed air engine working mode.

* * * * *